(12) United States Patent
Kang et al.

(10) Patent No.: US 7,260,120 B2
(45) Date of Patent: Aug. 21, 2007

(54) ETHERNET SWITCHING APPARATUS AND METHOD USING FRAME MULTIPLEXING AND DEMULTIPLEXING

(75) Inventors: Sung Soo Kang, Daejeon (KR); Hae Won Jung, Daejeon (KR); Hyeong Ho Lee, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1015 days.

(21) Appl. No.: 10/440,789

(22) Filed: May 19, 2003

(65) Prior Publication Data
US 2004/0090995 A1    May 13, 2004

(30) Foreign Application Priority Data
Nov. 7, 2002    (KR)    ............... 10-2002-0068906

(51) Int. Cl.
*H04J 3/04* (2006.01)
(52) U.S. Cl. ............... 370/535; 370/536; 370/537; 370/542
(58) Field of Classification Search ............... 370/466, 370/474, 476, 536, 537, 538, 540, 542, 535
See application file for complete search history.

(56) References Cited

U.S. PATENT DOCUMENTS

| | | | |
|---|---|---|---|
| 6,246,692 B1 | 6/2001 | Dai et al. | |
| 6,249,528 B1 | 6/2001 | Kothary | |
| 6,256,306 B1 | 7/2001 | Bellenger | |
| 6,310,882 B1 | 10/2001 | Lorenz et al. | |
| 6,757,282 B1* | 6/2004 | Ofek | ............ 370/389 |
| 6,778,536 B1* | 8/2004 | Ofek et al. | ............ 370/395.4 |
| 2002/0051468 A1* | 5/2002 | Ofek et al. | ............ 370/503 |

* cited by examiner

*Primary Examiner*—Hassan Kizou
*Assistant Examiner*—Mounir Moutaouakil
(74) *Attorney, Agent, or Firm*—Blakely Sokoloff Taylor & Zafman

(57) ABSTRACT

The present invention provides an Ethernet switching apparatus using frame multiplexing and demultiplexing. The Ethernet switching apparatus has a plurality of frame demultiplexers, a plurality of frame multiplexers and a switch fabric chip set. The frame demultiplexers convert at least one 10 gigabits Ethernet frame into a plurality of gigabit Ethernet frames. The frame multiplexers convert a plurality of gigabit Ethernet frames into at least one 10 gigabits Ethernet frame. The switch fabric chip set is provided with input and output interfaces using the GMII, and is connected to the frame demultiplexers and the frame multiplexers in the GMII format. The switch fabric chip set outputs frames through an arbitrary usable one of a plurality of GMII ports connected to a corresponding frame multiplexer if the frames are transmitted to the corresponding frame multiplexer.

38 Claims, 12 Drawing Sheets

ETHERNET SWITCHING APPARATUS AND METHOD USING FRAME MULTIPLEXING AND DEMULTIPLEXING

BACKGROUND OF THE INVENTION

1. Field of the Invention

The present invention relates generally to an Ethernet switching apparatus and method, and more particularly to an Ethernet switching apparatus and method using frame multiplexing and demultiplexing, which can correctly set a frame transmission sequence without information on the internal path of a switch fabric chip set by multiplexing a plurality of 1 gigabit Ethernet frames to one or more 10 gigabit Ethernet frames and demultiplexing one or more 10 gigabit Ethernet frames to a plurality of 1 gigabit Ethernet frames.

2. Description of the Prior Art

Generally, in order to implement an Ethernet switching apparatus, the configuration of a shared bus is used if a frame transmission speed of an input/output port is not high and a memory speed is low. On the other hand, an Ethernet switching apparatus is implemented using a switch fabric employing a crosspoint matrix so as to solve a bandwidth problem of the shared bus if the speed of an input/output port is higher than a gigabit level and a large capacity Ethernet switch is required. However, even in this case, the switch fabric must operate at the same speed as the speediest input/output port.

In the simplest prior art embodiment implementing such an Ethernet switching apparatus, it can be most realistically seen that low speed input streams are time division multiplexed to higher speed data streams. However, time division multiplexing (TDM) is disadvantageous in that frames must be configured to recognize respective input ports, and exclusive channels must be used due to the characteristics of TDM, thus decreasing the efficiency of bandwidth use.

Several methods and apparatuses have been proposed and used so as to overcome the disadvantage in the prior art.

For example, the U.S. Pat. No. 6,256,306 B1 (July, 2001) is proposed to provide scalability of network switches. In this patent, a bus-shaped switch node containing a route table constructed by joining local area network (LAN) standard technologies, such as high speed Ethernet, similar bridge protocols, etc., and a frame buffer, and unit switch modules having a plurality of Ethernet ports connected to the switch node are constructed in the form of an integrated circuit (IC). Further, if a plurality of unit switch modules are combined with LAN standard technologies, such as high speed Ethernet, similar bridge protocols, etc., an N*N atomic type switch mesh can be constructed, so an Ethernet network switch with very high scalability can be constructed. However, in the above method, the scalability of the network switch is very high, while a maximum processing speed per port obtained by a user port is limited to those of Ethernet ports of the unit switch modules. Moreover, this method is problematic in that the bus-shaped unit switch modules must have a processing capacity equal to or greater than 10 gigabits so as to provide 10 gigabit Ethernet ports to users.

Further, the implementation of a high speed switch architecture through the insertion of high speed media between a 2-gigabit backplane of a concentrator and a gigabit fiber optic Ethernet link is disclosed in U.S. Pat. No. 6,310,882 B1 (October, 2001). The object of this patent is to increase the efficiency of a fiber optic link by independently performing forwarding processing for transmission and reception packets in high speed media. However, the switch having the above architecture is problematic in that its maximum capacity and bandwidth are fundamentally limited due to the transmission speed of the fiber optic link.

Further, a network switch in which ATM ports and Ethernet ports are mixed is disclosed in U.S. Pat. No. 6,249,528 B1 (July, 2001). In this patent, an Ethernet frame format is different from an asynchronous transfer mode (ATM) format. Therefore, in order to reduce the number of ATM cell converters and the Ethernet frame converters required at each port, when an ATM port transmits packets to an Ethernet port, the ATM port transmits packets to a shared Ethernet frame converter through a crossbar switch to allow the packets to be converted into Ethernet frames, and thereafter the Ethernet frame converter outputs the Ethernet frames to a desired Ethernet port using the crossbar switch. On the other hand, when the Ethernet port transmits packets to the ATM port, the Ethernet port transmits the packets to a shared ATM cell converter through the crossbar switch to allow the packets to be converted into ATM cells, and thereafter the ATM cell converter transmits the ATM cells to a desired ATM port using the crossbar switch. This method is advantageous in that it can reduce the number of ATM cell converters and the Ethernet frame converters, while it is disadvantageous in that, since it uses the crossbar switch twice, packet converting ability per unit time of the crossbar switch is decreased as the frequency of packet transmission between the ATM port and the Ethernet port is increased.

Further, a packet switching fabric disclosed in U.S. Pat. No. 6,246,692 B1 (June, 2001) is constructed such that a ring pair comprised of a data ring and a control ring and unit switch modules accommodating a plurality of user ports are coupled to each other as a ring architecture, and an exclusive managing device for traffic management of the ring is inserted into the ring. Through the above construction, the switching fabric is operated such that a unit switch module having a medium and low speed user port executes traffic processing using a cut-through method, and a unit switch module having a Gbps-level port provides a service using a resource reservation allocation method so as to prevent the deterioration of the performance of an entire system. In this case, an exclusive protocol method is used in such traffic management. However, the switching fabric using the protocol method is limited in that the entire capacity of the switching fabric is determined according to the transmission speed of the ring which is a part constituting the core of the switching fabric, and is problematic in that it causes a burden of frame conversion due to the use of an exclusive device.

As described above, the conventional TDM method is problematic in that the efficiency of bandwidth use is decreased, and the switching fabric employing a ring architecture is problematic in that the transmission speed of the ring must be increased to be greater than 10 Gbps. Further, the network switch using a crossbar switch is problematic in that the processing speed of the crossbar switch is inevitably reduced to the maximum speed obtained by a port. The switching fabric using an exclusive device or an exclusive protocol for traffic management is problematic in that it requires an additional high speed switch, and a protocol converter for reconverting converted high speed packets into original Ethernet packets, and further requires an additional interface circuit for connection to a conventional chip set.

SUMMARY OF THE INVENTION

The present invention provides an Ethernet switching apparatus and method using frame multiplexing and demultiplexing, which uses a universal gigabit switch chip set and applies standard interfaces to a multiplexer and a demultiplexer, thus reducing the costs caused by the use of universal chips, and which performs packet multiplexing, thus maximizing the efficiency of channels.

In addition, the present invention provides an Ethernet switching apparatus using frame multiplexing and demultiplexing, comprising a plurality of frame demultiplexers for converting at least one 10 gigabit Ethernet frame received in a 10 Gigabit Media Independent Interface (XGMII) format into a plurality of gigabit Ethernet frames of a Gigabit Media Independent Interface (GMII) format, and outputting the gigabit Ethernet frames; a plurality of frame multiplexers for converting a plurality of gigabit Ethernet frames received in a GMII format into at least one 10 gigabit Ethernet frame of a XGMII format, and outputting the 10 gigabit Ethernet frame; and a switch fabric chip set provided with input and output interfaces using a GMII, and connected to the frame demultiplexers and the frame multiplexers in the GMII format, the switch fabric chip set outputting frames through an arbitrary usable one of a plurality of GMII ports connected to a corresponding frame multiplexer if the frames are transmitted to the corresponding frame multiplexer, the GMII connected to the frame multiplexers and the frame demultiplexers being set to support a full duplex mode.

Further, the present invention provides an Ethernet switching method using frame multiplexing and demultiplexing in an Ethernet switching apparatus comprising a plurality of frame demultiplexer and multiplexer pairs, comprising the steps of performing frame demultiplexing; and performing frame multiplexing; wherein the frame demultiplexing comprises the steps of 1) storing at least one 10 Gigabit Ethernet frame for 10 Gigabit Media Independent Interface (XGMII) received in a XGMII format and converting the 10 gigabit Ethernet frame into gigabit Ethernet frames for gigabit Media Independent Interface (GMII) by a buffer_conversion unit, 2) analyzing destinations and reception conditions of the gigabit Ethernet frames and selecting a port to output the gigabit Ethernet frames by a port_analysis_control unit, 3) receiving source information of a 10 gigabit Ethernet frame from each of other frame demultiplexers to form a destination address table in the port_analysis_control unit by a source_input unit, and transmitting a destination address, a source address and a frame demultiplexer number of the frame received from the buffer_conversion unit to the source_input unit by the source_output unit, 4) transmitting the gigabit Ethernet frames converted by the buffer_conversion unit to a specific port by a port_selection unit, and 5) storing and outputting the plural gigabit Ethernet frames selected by the port_selection unit by a plurality of output_buffers; wherein the frame multiplexing comprises the steps of 6) storing gigabit Ethernet frames received in the GMII format, and detecting PAUSE frames by a plurality of input_buffers, 7) transmitting source address information of 10 gigabit Ethernet frames, received from other multiplexer/demultiplexer pairs, to a selection_control unit by the source_input unit, 8) receiving the source address information, and generating a control signal for selecting one of the plural input_buffers by the selection_control unit, and 9) selecting one of a plurality of gigabit Ethernet frames in response to the control signal, converting the selected gigabit Ethernet frame into at least one 10 gigabit Ethernet frame, and outputting the 10 gigabit Ethernet frame by a selection_conversion unit.

The present invention relates to an Ethernet switching apparatus and method using high speed Ethernet frame multiplexing and demultiplexing. The Ethernet switching apparatus and method of the present invention uses a gigabit-level low speed switch fabric chip set, and multiplexes and demultiplexes high speed Ethernet packets using a Gigabit Media Independent Interface (GMII) and a 10 Gigabit Media Independent Interface (XGMII) which are Institute of Electrical and Electronic Engineers (IEEE) 802 standard interfaces. In the present invention, a 10 gigabit-level Ethernet switching apparatus is implemented by multiplexing a plurality of 1 gigabit Ethernet frames to one or more 10 gigabit Ethernet frames, demultiplexing one or more 10 gigabit Ethernet frames to a plurality of 1 gigabit Ethernet frames, and connecting the multiplexed and demultiplexed results to a gigabit-level switch fabric chip set.

Through the implementation, an Ethernet switch having a plurality of 10 gigabit Ethernet ports can be realized by using a universal gigabit Ethernet switch fabric chip set with a GMII interface, multiplexing gigabit Ethernet frames to 10 gigabit Ethernet frames, and demultiplexing 10 gigabit Ethernet frames to gigabit Ethernet frames. Therefore, the present invention uses a low speed switch chip set, without using a coprocessor with a high speed frame processing function, thus realizing economic benefits. Further, the present invention can use conventional universal chips by applying standard interfaces to input and output interface manners, and can widen a range of applicable chip sets by ensuring a frame transmission sequence without information on the internal path of the used switch chip set, thus enabling a user to freely select chip sets without depending on a specific chip set provider when the Ethernet switch is designed.

In the present invention, GMII and XGMII, which are IEEE 802.3 standard interfaces, are used between a gigabit Ethernet Media Access Control (MAC) unit and a 10 gigabit Ethernet transceiver. Therefore, the Ethernet switching apparatus having a plurality of 10 gigabit Ethernet ports can be implemented using a universal switch chip set, for example, SwitchCore CXE-16 and CXE-2010, Intel IXE5416, IBM PRS64G, Marvell GT-4830xA (Marvel Prestera-EX120), GT-48360, IBM NP4GS3, etc., and a physical layer chip. Further, the present invention is advantageous in that it can transmit Ethernet frames by multiplexing and demultiplexing the Ethernet frames without varying transmission protocols. Further, the present invention is advantageous in that, even if switch path information within a gigabit Ethernet switch chip set is not known, frame transmission sequence, which is one of basic principles of an Ethernet switch, does not change. Especially, the present invention is characterized in that it can dynamically multiplex packets to generate 10 gigabit Ethernet frames and can transmit the generated 10 gigabit Ethernet frames, without using expensive and complicated functional units, such as coprocessors for packet classification and traffic management. Moreover, the present invention is advantageous in that it can multiplex ten or more gigabit Ethernet ports when gigabit Ethernet frames are transmitted.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of the present invention will be described in detail with reference to the attached drawings.

Figure 1:
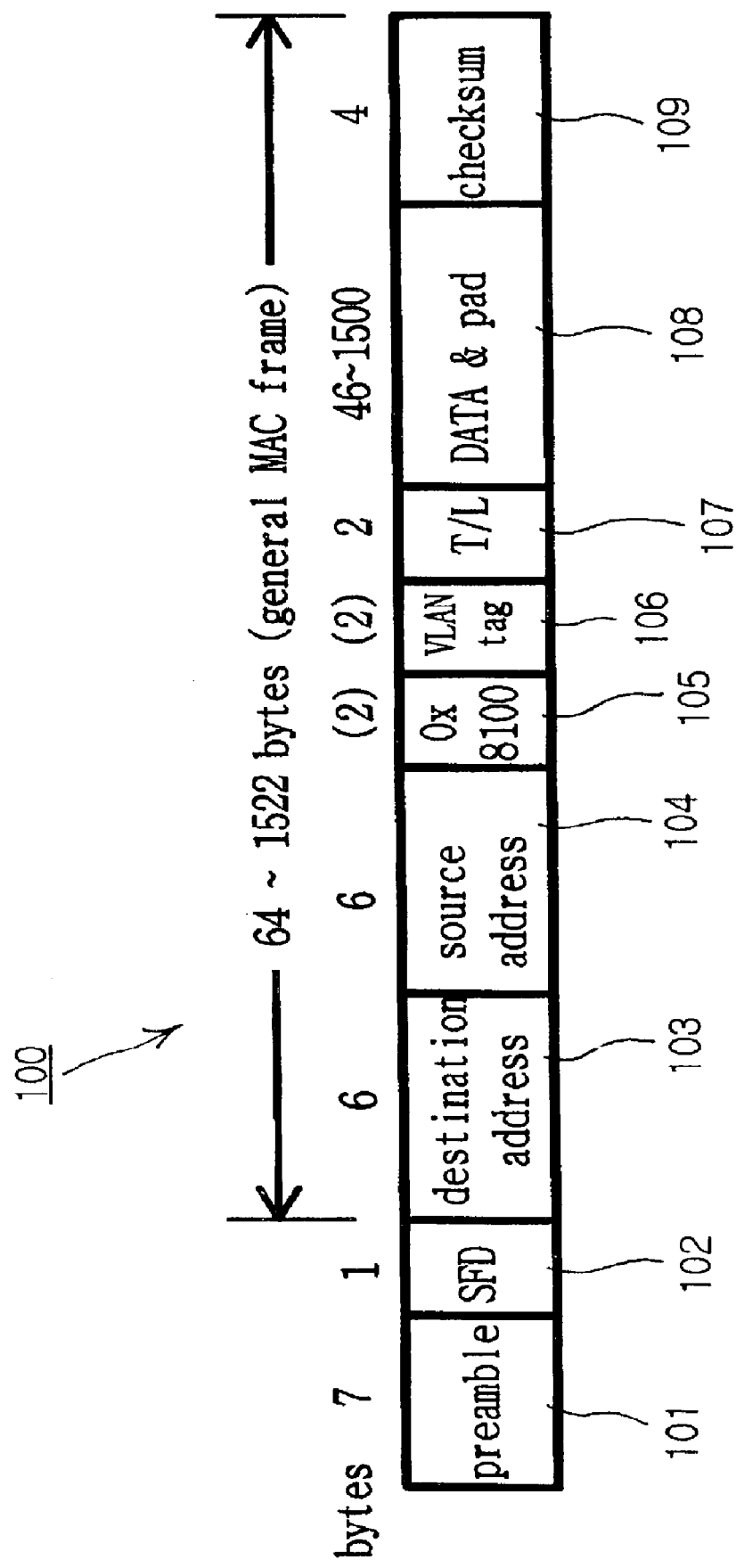
FIG. 1 is a view showing the format of an Ethernet frame applied to the present invention.

FIG. 1 is a view showing the format of an Ethernet frame applied to the present invention, wherein the format of a frame applied to the Ethernet having typical MAC frames is depicted. Referring to FIG. 1, the construction and operation of an Ethernet frame 100 is described in detail on the basis of standards defined in IEEE 802.3.

That is, if "10101011" which is a Start of Frame Delimiter (SFD) 102 appears after a 7-byte preamble 101 of identical "10101010" patterns, the SFD 102 is recognized to indicate the start of a MAC frame. After the SFD 102, a 6-byte destination address (DA) 103 and a 6-byte source address (SA) 104 follow in order. If the Ethernet frame is applied to a Virtual Local Area Network (VLAN), a 2-byte Ox8100 value 105 for representing that its next two bytes represent a VLAN tag, and a 2-byte VLAN tag 106 corresponding to the Ox8100 value 105 follow in order after the SA 104.

Next, 2-byte type/length (T/L) information 107, and data and pad information 108 with a variable length of 46 to 1500 bytes follow in order after the VLAN tag 106. Finally, 4-byte checksum information 109 is added. The minimum length of the Ethernet frame is prescribed to be 64 bytes, so a pad is added to set the length of a frame to 64 bytes if the length of the frame is shorter than 64 bytes. Further, in the case where successive frames are transmitted, an Inter-Frame Gap (IFG) is inserted between the frames so as to provide a frame processing time of MAC. The configuration of such a frame can be used in the case where Ethernet frames are transmitted in both a full duplex (FDX) mode and a half duplex (HDX) mode. Especially, the frame configuration is used when Ethernet frames are transmitted in a full duplex mode at a speed higher than gigabit.

Meanwhile, the configuration and operation of GMII, which is a standard interface by which MAC of the gigabit Ethernet is connected to a physical layer, is described in detail on the basis of standards defined in IEEE 802.3.

Figure 2:
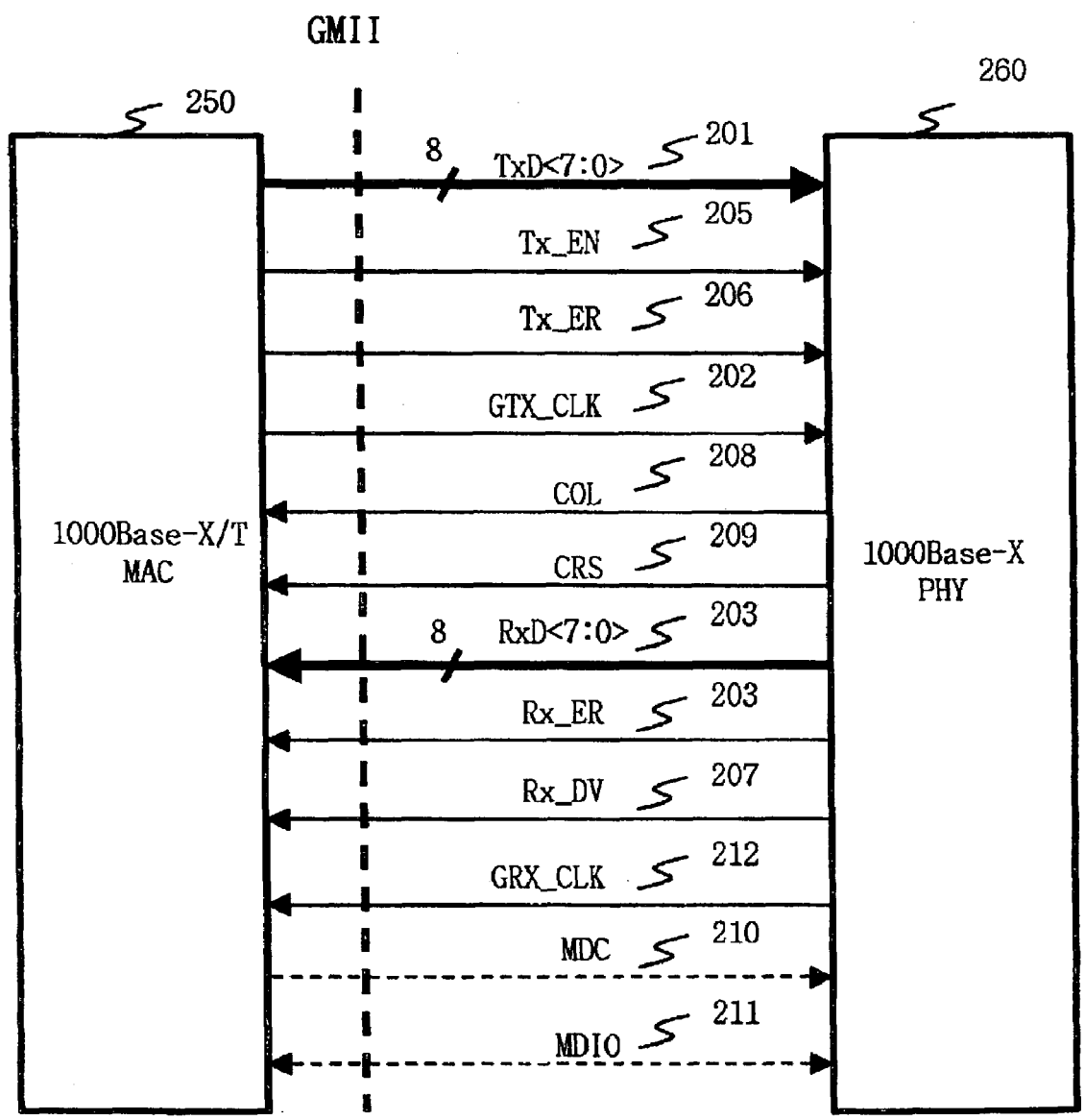
FIG. 2 is a view showing GMII which is a gigabit Ethernet standard interface according to the present invention.

FIG. 2 is a view showing GMII which is a gigabit Ethernet standard interface according to the present invention. Referring to FIG. 2, TxD<7:0> 201 represents 8-bit transmission data which are transferred in parallel to a 1000BASE-X/T physical layer (GbE PHY) 260 from a 1000BASE-X/T MAC unit (GbE MAC) 250. GTX_CLK 202 represents a 125 MHz clock signal which the GbE MAC 250 transmits to the GbE PHY 260 so as to transmit the data TxD<7:0> 201.

RxD<7:0> 203 represents 8-bit reception data which transfer data received by the GbE PHY 260 in parallel to the GbE MAC 250. Further, GRX_CLK 212 represents a 125 MHz clock signal which the GbE PHY 260 transmits to the GbE MAC 250 so as to transmit the data RxD<7:0> 203.

Tx_EN 205 represents a signal for informing the GbE PHY 260 that the GbE MAC 250 transmits data to the GbE PHY 260 for a data transmission period. That is, while the GbE MAC 250 transmits data to the GbE PHY 260, the Tx_EN 205 is set to be logical "1" (hereinafter, referred to as high). Further, while the GbE MAC 250 does not transmit data, the Tx_EN 205 is transitioned to logical "0" (hereinafter, referred to as low). Tx_ER 206 is transitioned to high when error is generated during the transmission of valid data, a carrier is extended, or carrier extension error is generated; otherwise, the Tx_ER 206 is low.

Rx_DV 207 represents a signal for informing the GbE MAC 250 that the GbE PHY 260 transmits data to the GbE MAC 250 for a data transmission period. That is, while the GbE PHY 260 transmits data to the GbE MAC 250, the Rx_DV 207 is high. On the contrary, while the GbE PHY 260 does not transmit data, the Rx_DV 207 is transitioned to low.

COL 208 represents a signal for informing the GbE MAC 250 that data collision is generated in the GbE PHY 260. If the GbE PHY 260 is operated in a half duplex mode, CRS 209 transmitted to the GbE MAC 250 from the GbE PHY 260 is high while transmission and reception media are in use. Further, while the transmission and reception media are in idle states, CRS 209 is transitioned to low. The signals CRS 209 and COL 208 are used when the gigabit Ethernet is operated in the half duplex (HDX) mode. However, when the GbE PHY 260 is operated in the full duplex (FDX) mode, the GbE MAC 250 ignores the signals CRS 209 and COL 208 generated by the GbE PHY 260. Further, signals MDC 210 and MDIO 211 between the GbE MAC 250 and a Station Management Entity (STA) are required when the GbE MAC 250 brings operating control information (that is, FDX or HDX) and status information of the GbE PHY 260.

Figure 3:
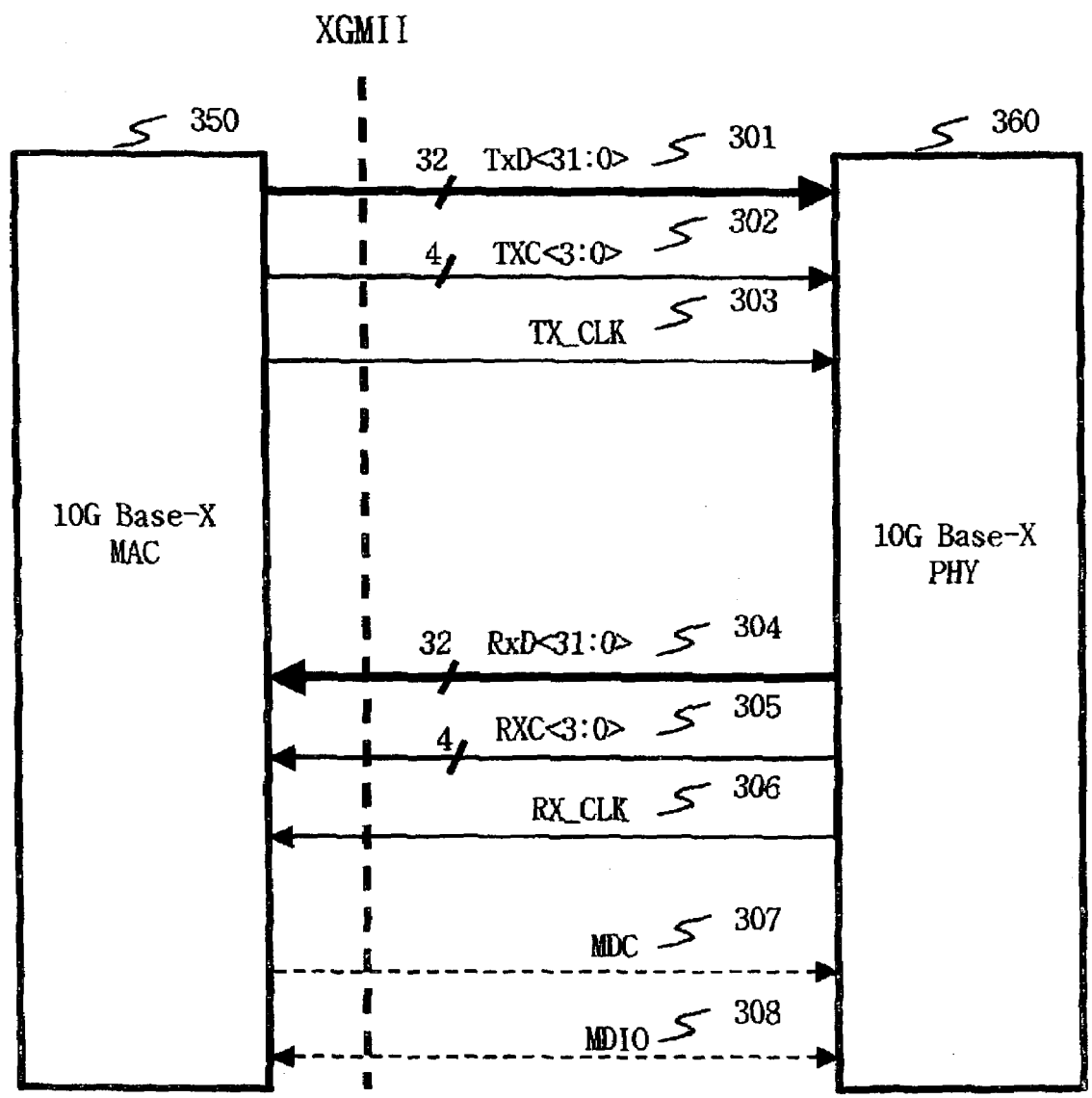
FIG. 3 is a view showing XGMII which is a 10 gigabit Ethernet standard interface according to the present invention.

FIG. 3 is a view showing XGMII which is a 10 gigabit Ethernet standard interface according to the present invention. The XGMII is a standard interface defined in IEEE 802.3, via which the MAC is connected to a physical layer. Such 10 gigabit Ethernet employs only a full duplex (FDX) mode, differently from the gigabit Ethernet.

Referring to FIG. 3, TxD<31:0> 301 represents 32-bit transmission data transferred in parallel to a 10 G BASE-X PHY (XGbE PHY) 360 from a 10 G BASE-X MAC (XGbE MAC) 350. In this case, the data TxD<31:0> are divided into four lanes of 8 bits, like TxD<7:0>, TxD<15:8>, TxD<23:16> and TxD<31:24>, and transmitted.

TXC<3:0> 302 represents a 4-bit parallel signal transmitted to the XGbE PHY 360 from the XGbE MAC 350, and represents whether TxD is a data signal or a control signal.

That is, TXC<0>, TXC<1>, TXC<2> and TXC<3> of the TXC<3:0> 302 serve to represent respectively whether the respective bit values of TxD<7:0>, TxD<15:8>, TxD<23: 16> and TxD<31:24> are actual MAC frame data, a preamble for sending MAC frame data, a SFD, an End Of Frame, or an error indication signal according to the states (high or low) of respective signal lines of the TXC<3:0> 302.

TX_CLK 303 represents a 156.25 MHz clock signal transmitted to the XGbE PHY 360 from the XGbE MAC 350 so as to transmit the data TxD <31:0> 301. The TxD <31:0> 301 and the TXC <3:0> 302 are transmitted in synchronization with the TX_CLK 303 in a double data rate (DDR) manner.

RxD<31:0> 304 represents 32-bit data which transfer data received by the GbE PHY 360 in parallel to the XGbE MAC 350. In this case, the RxD<31:0> are divided into four lanes of 8 bits, like RxD<7:0>, RxD<15:8>, RxD<23:16> and RxD<31:24>, and transmitted.

RXC<3:0> 305 represents a 4-bit parallel signal transmitted to the XGbE MAC 350 from the XGbE PHY 360, and represents whether RxD is a data signal or a control signal. That is, RXC <0>, RXC<1>, RXC<2> and RXC<3> of the RXC<3:0> 302 serve to represent respectively whether the respective bit values of RxD<7:0>, RxD<15:8>, RxD<23: 16> and RxD<31:24> are actual MAC frame data, a preamble for sending MAC frame data, a SFD, an End of Frame, or an error indication signal according to the states (high or low) of respective signal lines of RXC<3:0> 305.

Further, RX_CLK 306 represents a 156.25 MHz clock signal transmitted to the XGbE MAC 350 from the XGbE PHY 360 so as to transmit the data RxD<31:0> 304. The RxD <31:0> 304 and the RXC <3:0> 305 are transmitted in synchronization with the RX_CLK 306 in a DDR manner. Further, signals MDC 307 and MDIO 308 between the XGbE MAC 350 and a STA are required when the XGbE MAC. 350 brings operating control information (speed selection) and status information of the XGbE PHY 360.

Figure 4:
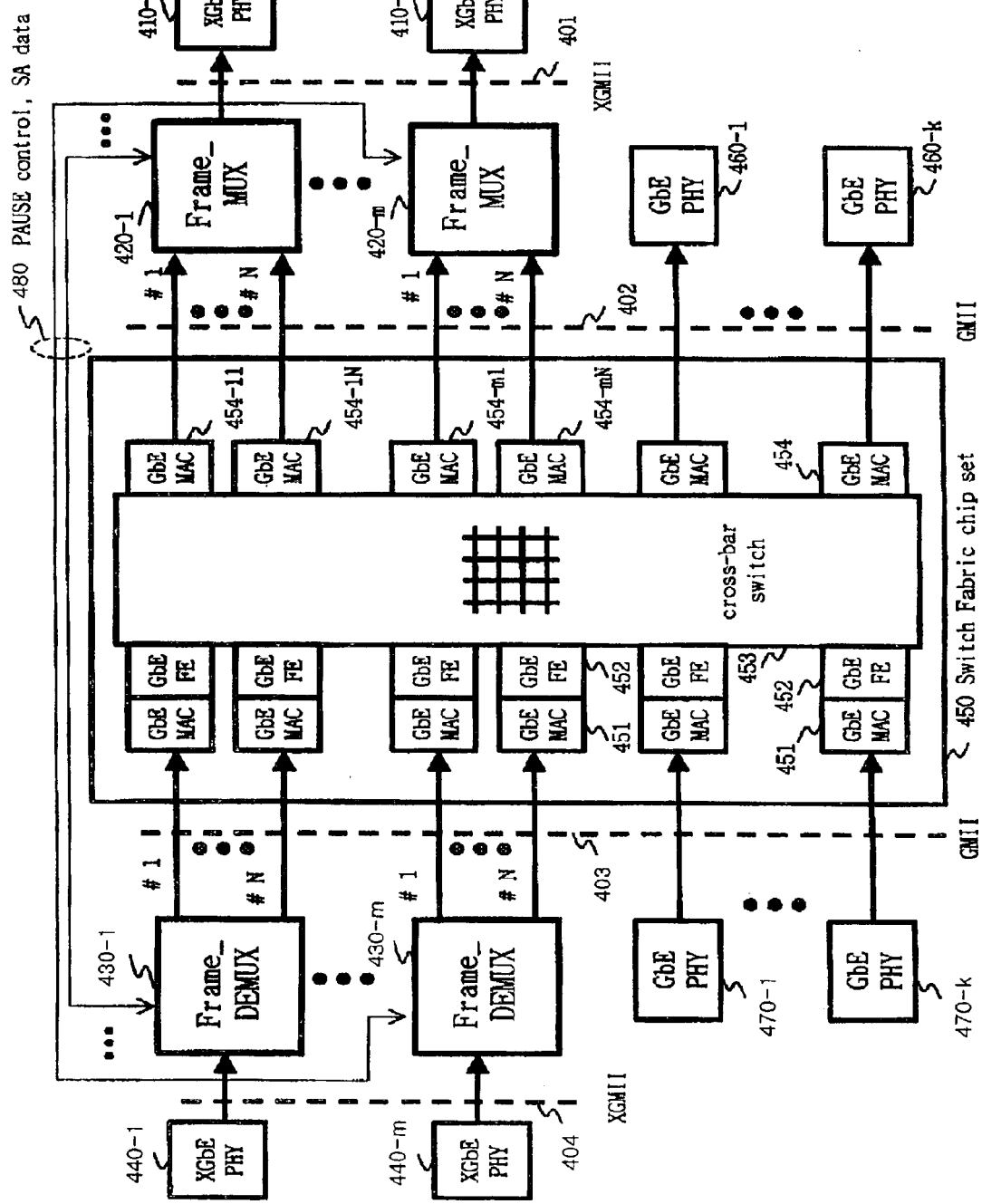
FIG. 4 is a block diagram of an Ethernet switching apparatus according to the present invention.

FIG. 4 is a block diagram of an Ethernet switching apparatus according to the present invention. Referring to FIG. 4, GMII 402 comprises signals TxD<7:0>, Tx_EN, Tx_ER and GTX_CLK required when the GbE MAC 250 transmits data to the GbE PHY 260, and MDC and MDIO required in operation management, in the GMII of FIG. 2. Further, GMII 403 comprises signals RxD<7:0>, Rx_DV, Rx_ER and GRX_CLK, CRS and COL, required when the GbE MAC 250 receives data from the GbE PHY 260, and MDC and MDIO required in operation management, in the GMII of FIG. 2.

Further, XGMII 401 comprises signals TxD<31:0>, TXC <3:0> and TX_CLK, required when the XGbE MAC 350 transmits data to the XGbE PHY 360, and MDC and MDIO required in operation management, in the XGMII of FIG. 3. Further, XGMII 404 comprises signals RxD<31:0>, RXC<3:0> and RX_CLK, required when the XGbE MAC 350 receives data from the XGbE PHY 360, and MDC and MDIO required in operation management, in the XGMII of FIG. 3.

A switch fabric chip set 450 of FIG. 4 is a universal switch chip set using the standard interface GMII, and comprises a GbE MAC 451, a gigabit Ethernet Forwarding Engine (GbE FE) 452, a crossbar switch 453 and GbE MACs 454, 454-11, . . . 454-1N, . . . 454-m1, . . . 454-mN. Further, the GbE MAC 451 performs the function of receiving gigabit Ethernet frames, and the GbE MAC 454 performs the function of transmitting gigabit Ethernet frames. Therefore, if the GbE MACs 451 and 454 are combined, the 1000BASE-X/T MAC 250 of FIG. 2 is constituted, thus forming a pair. Further, the GbE MACs 454-11 to 454-mN have the same construction and function as the GbE MAC 454, but differing from the GbE MAC 454 only in that they are connected to frame_multiplexers (Frame_MUXes) 420-1 to 420-m. Accordingly, the switch fabric chip set 450 receives an Ethernet frame through the standard interface GMII 403, compares a destination address (DA) of the Ethernet frame with those in an internal address table using its forwarding engine to determine a switching route, and outputs the Ethernet frame through the standard interface GMII 402. In this case, if the received frame is outputted to a selected one of the frame_multiplexers 420-1 to 420-m, the selected frame_multiplexer, for example, 420-1, is connected to N GbE MACs. Therefore, the GbE FE 452 allows the frame to be transmitted to an arbitrary GbE MAC of the N GbE MACs (for example, there are N ports having the same MAC address).

There are various methods for the GbE FE 452 to select a specific GbE MAC. For example, the GbE FE 452 can select a GbE MAC in an idle state for the longest time and select a GbE MAC having its buffer with the largest remaining capacity or discard a frame in the case where a GbE MAC in the idle state does not exist. However, this selection method is not within the scope of the present invention.

In FIG. 4, GbE PHYs 470-1 to 470-k represent transmission units of the 1000BASE-X PHY 260 of FIG. 2, and GbE PHYs 460-1 to 460-k represent reception units thereof. Therefore, a specific pair of a GbE PHY in the left side of FIG. 4 and a GbE PHY in the right side of FIG. 4, for example, a GbE PHY 470-1 and a GbE PHY 460-1, constitute a single gigabit physical layer port. Similarly to this, XGbE PHYs 440-1 to 440-m represent transmission units of the 10 G BASE-X PHY 360 of FIG. 3, and XGbE PHYs 410-1 to 410-m represent reception units thereof. Therefore, a specific pair of an XGbE PHY in the left side of FIG. 4 and an XGbE PHY in the right side of FIG. 4, for example, an XGbE PHY 410-2 and an XGbE PHY 440-2 constitute a single 10 gigabit physical layer port.

Meanwhile, frame_demultiplexers (Frame_DEMUXes) 430-1 to 430-m of FIG. 4 represent units for demultiplexing 10 gigabit Ethernet frames received through the XGMII 404 to gigabit Ethernet frames and transmitting the gigabit Ethernet frames to the switch fabric chip set 450 through the GMII 403. In this case, the Frame_DEMUXes 430-1 to 430-m are the same as a Frame_DEMUX 530-1 of FIG. 5. Further, Frame_MUXes 420-1 to 420-m of FIG. 4 represent units for multiplexing gigabit Ethernet frames received from the switch fabric chip set 450 to 10 gigabit Ethernet frames and transmitting the 10 gigabit Ethernet frames to the XGbE PHYs 410-1 to 410-m through the XGMII 401. In this case, the Frame_MUXes 420-1 to 420-m are the same as a Frame_MUX 520-1 of FIG. 5. Therefore, a specific pair of a Frame_DEMUX in the left side of FIG. 4 and a Frame_ MUX in the right side of FIG. 4, for example, a Frame_ DEMUX 420-m and a Frame_MUX 430-m constitute a single 10 gigabit multiplexer/demultiplexer pair, such as a MULDEX 500-1 of FIG. 5.

Figure 5:
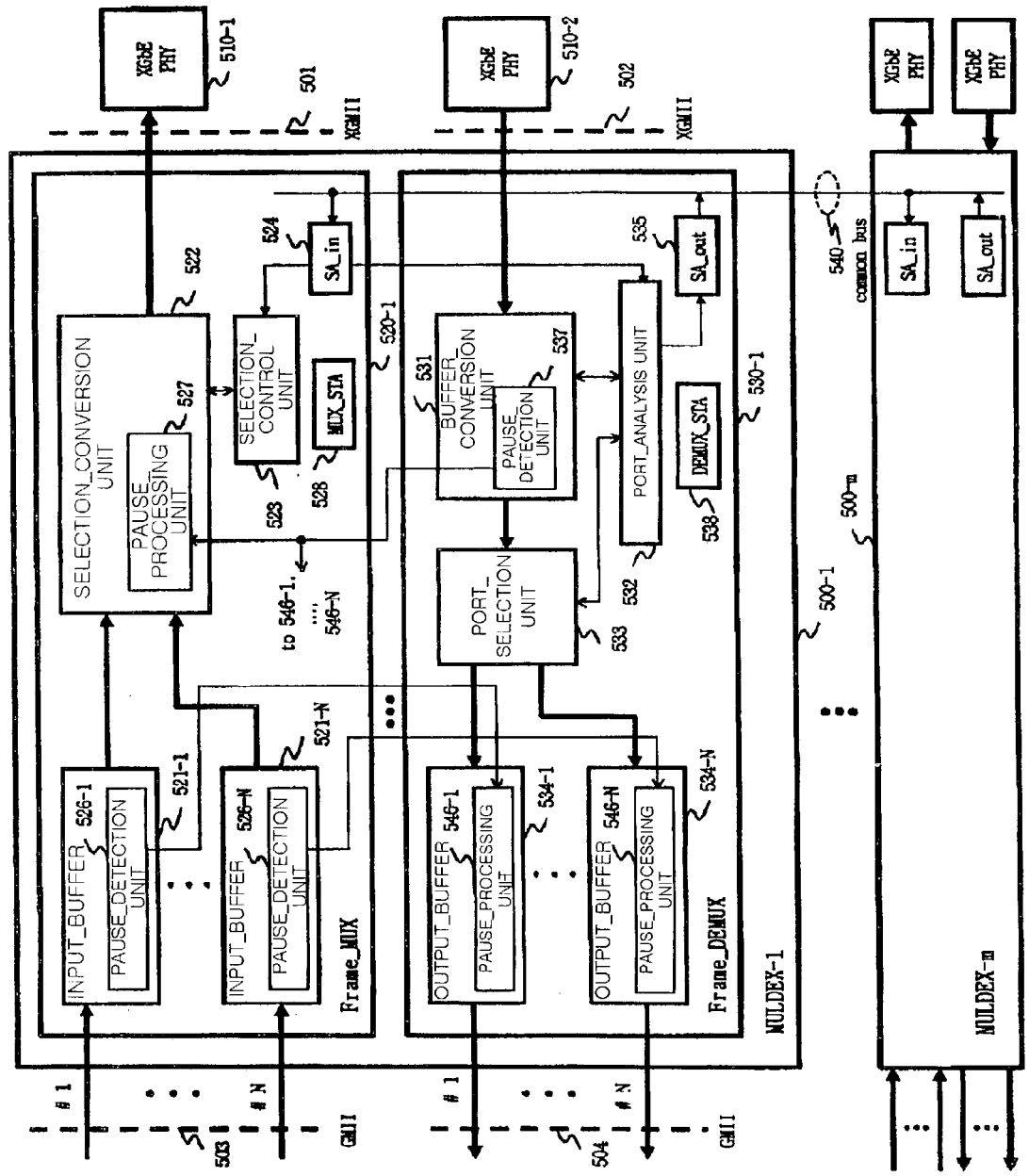
FIG. 5 is a block diagram showing the construction of a frame multiplexer/demultiplexer according to the present invention.

FIG. 5 is a block diagram of a frame multiplexer/demultiplexer (MULDEX) according to the present invention. Referring to FIG. 5, GMII 503, XGMII 501, XGbE PHY 510-1, XGbE PHY 510-2, XGMII 502 and GMII 504 represent the same interfaces as the GMII 402, XGMII 401, XGbE PHY 410-1, XGbE PHY 440-1, XGMII 404 and GMII 403 of FIG. 4, respectively, and perform the same functions as them. Further, the Frame_MUX 520-1 and the Frame_DEMUX 530-1 of FIG. 5 are the same as the Frame_MUX 420-1 and the Frame_DEMUX 430-1 of FIG. 4, respectively, and perform the same functions as them. Further, the Frame_MUX 520-1 and the Frame_DEMUX 530-1 of FIG. 5 constitute a MULDEX 500-1, one of m frame multiplexer/demultiplexer pairs (MULDEXes). Therefore, there are MULDEXes 500-2 to 500-m which perform the same functions as the MULDEX 500-1. However, they are only different from each other in that they are connected to XGbE PHYS, which are physical layers, Frame_MUXes and Frame_DEMUXes indicated by different reference numerals, respectively.

In FIG. 5, input buffers 521-1 to 521-N are respectively connected to the GbE MACs 454-11 to 454-N of the switch fabric chip set of FIG. 4 through the GMII 503. Output buffers 534-1 to 534-N are connected to the GbE MAC 451 of the switch fabric chip set 450 of FIG. 4 through the GMII 504. Further, the GbE MACs 451, 454-11 to 454-1N, . . . , 454-m1 to 454-mN of the switch fabric chip set 450, which are connected to the MULDEXes 500-1 to 500-m through the GMII 503 and GMII 504 are operated in the full duplex (FDX) mode. In FIG. 5, the Frame_MUX 520-1 is comprised of input_buffers 521-1 to 521-N, a selection_conversion unit 522, a selection_control unit 523, a source_input (SA_in) unit 524, and a MUX_STA unit 528. Further, the Frame_DEMUX 530-1 of FIG. 5 is comprised of output_buffers 534-1 to 534-N, a port_selection unit 533, a buffer_conversion unit 531, a port_analysis_control unit 532, a source_output (SA_out) unit 535 and a DEMUX_STA 538.

The input_buffers 521-1 to 521-N receive and store gigabit Ethernet frames inputted through the GMII 503, and transfer the gigabit Ethernet frames to the selection_conversion unit 522. Further, PAUSE_detection units 526-1 to 526-N respectively included in the input_buffers 521-1 to 521-N each detect a PAUSE frame of the received Ethernet frames, analyze the PAUSE frame, and transfer the analyzed information to corresponding PAUSE_processing units 546-1 to 546-N of the output_buffers 534-1 to 534-N. Further, after transmitting 10 gigabit Ethernet frames through the XGMII 501, the selection_conversion unit 522 of FIG. 5 selects a specific input_buffer among the input_buffers 521-1 to 521-N in response to a signal outputted from the selection_control unit 523, converts the frames received by the selected input_buffer into 10 gigabit Ethernet frames, and transmits the 10 gigabit Ethernet frames to the XGbE PHY 510-1 through the XGMII 501. The selection_control unit 523 provides information to allow the selection_conversion unit 522 to select a specific input_buffer (521-i, i=any of 1 to N). The SA_in unit 524 receives SA information transmitted from other Frame_DEMUXes (in this case, 530-2 to 530-m). The SA_out unit 535 of FIG. 5 is used to send SA information to SA_in units 524 of other MULDEXes 500-1 to 500-N. A common_bus 540 is a bus to commonly connect SA_in units and SA_out units of respective MULDEX-1 to MULDEX-m to each other. Further, the MUX_STA unit 528 transmits status information of the Frame_MUX 520-1 through the MDC and MDIO.

In FIG. 5, the buffer_conversion unit 531 stores 10 gigabit Ethernet frames received from the XGbE PHY 510-2 through the XGMII 502, converts the 10 gigabit Ethernet frames into gigabit Ethernet frames, and thereafter provides required information to the port_analysis_control unit 532. At this time, the port_analysis_control unit 532 allows the port_selection unit 533 to select a specific output_buffer among output_buffers 534-1 to 534-N and transmit the gigabit Ethernet frames to the selected output_buffer. Further, the port_analysis_control unit 532 sends SA information to other Frame_MUXes (in this case, 520-2 to 520-N) and other Frame_DEMUXes (in this case, 530-2 to 530-N) through the SA_out unit 535. Further, the output_buffers 534-1 to 534-N of FIG. 5 receive and store gigabit Ethernet frames inputted through the port_selection unit 533, and output the gigabit Ethernet frames through the GMII 504. Further, the output_buffers 534-1 to 534-N stop transmitting Ethernet frames for a predetermined period of time set in PAUSE information in response to signals outputted from the PAUSE_detection units 546-1 to 546-N of the input_buffers after the outputting of Ethernet frames is completed. In this case, an output_buffer in a PAUSE state provides information to the PAUSE_processing unit 527 of the selection_control unit 522, thus preventing frames from being inputted for a PAUSE period. However, if frames are continuously inputted and so the risk of overflow of the output_buffer is sensed, frames are discarded using a Random Early Discard (RED) method, etc. Further, the DEMUX_STA unit 538 transfers status information of the Frame_DEMUX 530-1 through the MDC and MDIO.

Meanwhile, a PAUSE_detection unit 537 of FIG. 5 detects a PAUSE frame received through the XGMII 502, and transmits the detected PAUSE frame through the all output_buffers 534-1 to 534-N. Further, the PAUSE_detection unit 537 transmits the PAUSE frame to the PAUSE_processing unit 527 of the Frame_MUX 520-1. The PAUSE_processing unit 527 of the Frame_MUX 520-1 stops transmitting Ethernet frames for a predetermined period of time set in PAUSE information received from the PAUSE_detection unit 537, or generates a PAUSE frame signal containing appropriate PAUSE time information (set by the user) and outputs the PAUSE frame signal through the XGMII 501, if the number of output_buffers 534-1 to 534-N in a PAUSE state at the present time is greater than a threshold number set by the user.

Figure 6:
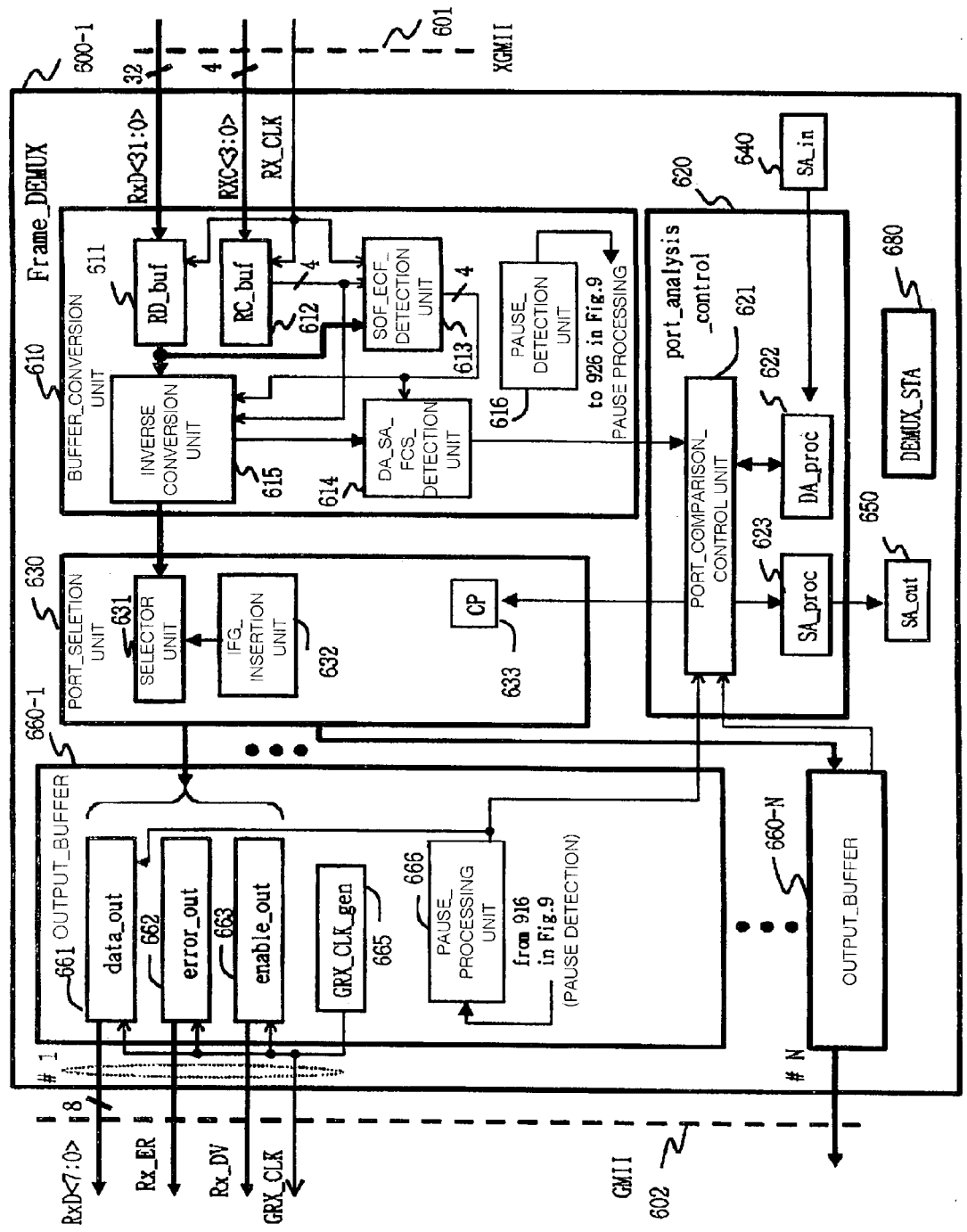
FIG. 6 is a block diagram showing the detailed construction of the frame demultiplexer according to the present invention.

FIG. 6 is a block diagram showing the detailed construction of the frame_demultiplexer according to the present invention. GMII 602 and XGMII 601 of FIG. 6 are the same interfaces as the standard interfaces GMII 504 and XGMII 502 of FIG. 5, respectively. Further, a buffer_conversion unit 610, a port_selection unit 630, a port_analysis_control unit 620, a SA_out unit 650, a demultiplexer_status monitoring (DEMUX_STA) unit 680 and output_buffers 660-1 to 660-N, which are included in a Frame_DEMUX 600-1 of FIG. 6, are the same as the buffer_conversion unit 531, the port_selection unit 533, the port_analysis_control unit 532, the SA_out unit 535, the demultiplexer_status monitoring (DEMUX_STA) unit 538 and output_buffers 534-1 to 534-N, respectively, which are included in the Frame_DEMUX 530-1 of FIG. 5. Further, a SA_in unit 640 in the Frame_DEMUX 600-1 of FIG. 6 is the same functional unit as the SA_in unit 524 in the Frame_DEMUX 530-1 of FIG. 5. Therefore, the Frame_DEMUX 600-1 is the same as the Frame_DEMUX 530-1 of FIG. 5.

Figure 9:
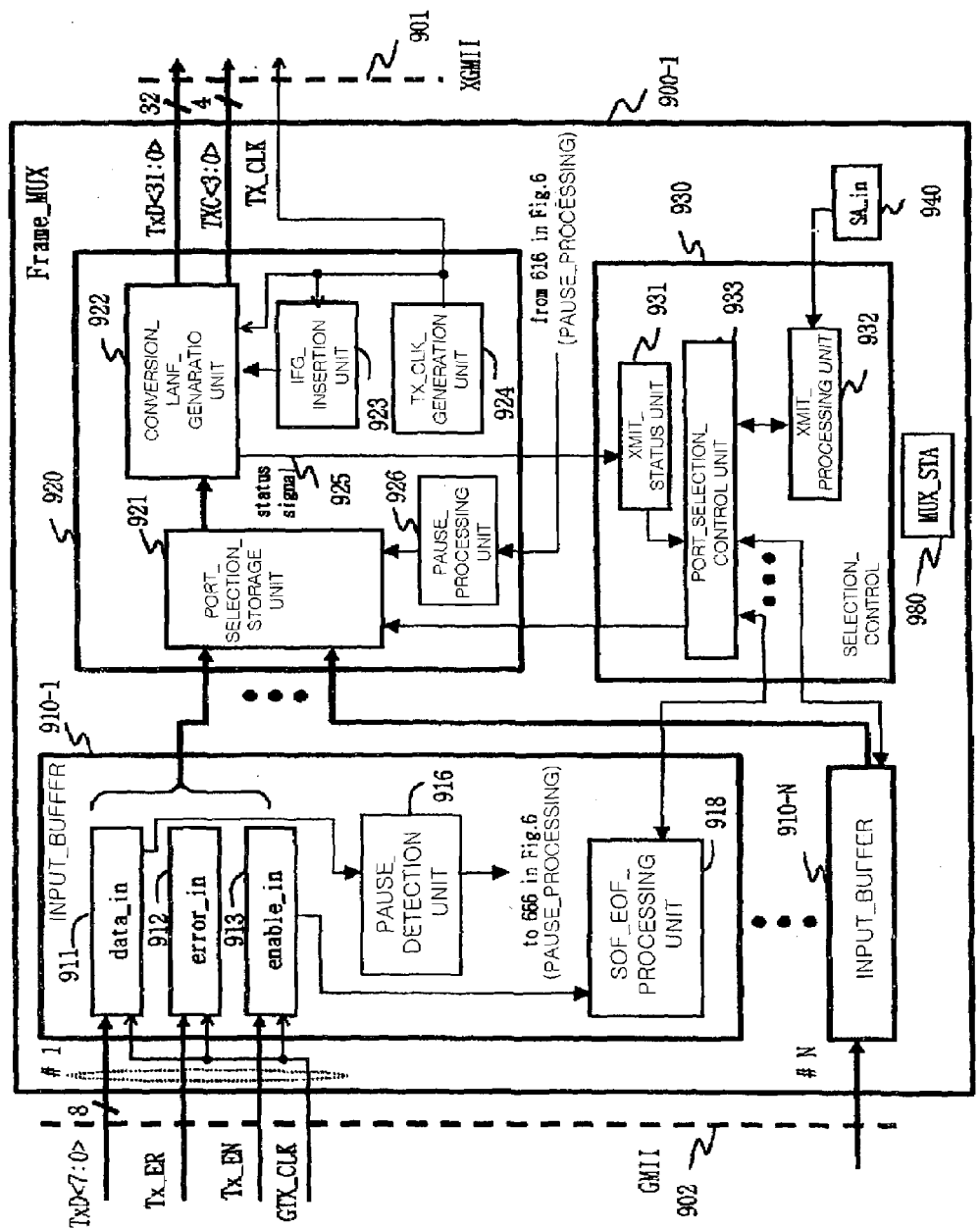
FIG. 9 is a block diagram showing the detailed construction of the frame multiplexer according to the present invention.

The buffer_conversion unit 610 of FIG. 6 is comprised of a reception data buffer (RD_buf) 611 connected to the RxD<31:0> of the XGMII 601, a reception condition buffer (RC_buff) 612 connected to the RxC<3:0> and the RX_CLK of the XGMII 601, a start_end_detection (SOF_EOF_detection) unit 613, an inverse conversion unit 615, a destination address detection (DA_SA_FCS_detection) unit 614, and a PAUSE_detection unit 616 connected to a PAUSE_processing unit 926 of FIG. 9 which will be described later.

Further, the port_selection unit 630 is comprised of a selector unit 631 connected to the inverse conversion unit 615, a cp unit 633 connected to a port_comparison_control unit 621, and an IFG_insertion unit 632. The port_analysis_ control unit 620 is comprised of a destination address processing (DA_proc) unit 622 connected to the SA_in unit 640, a source address processing (SA_proc) unit 623 connected to the SA_out unit 650, and the port_comparison_control unit 621.

Further, the output_buffer 660-1 is comprised of a data_output (data_out) unit 661 connected to the RxD <7:0> of the GMII 602, an error_output (error_out) unit 662 connected to the Rx_ER of the GMII 602, an enable_output (enable_out) unit 663 connected to the RxDV of the GMII 602, and a PAUSE_processing unit 666 connected to both the port_comparison_control unit 621 and a PAUSE_detection unit 916 of FIG. 9. Further, the internal constructions and connections of the remaining output_buffers 660-2 to 660-N are the same as that of the output_buffer 660-1.

The DEMUX_STA unit 680 outputs status information through the GMII and XGMII, wherein the detailed contents and methods related to the DEMUX_STA unit 680 are not included in the scope of the present invention.

As described above, a 10 gigabit Ethernet frame provides RxD <31:0>, and RXC<3:0> and RX_CLK to the reception data_buffer (RD_buf) 611 and the reception condition_buffer (RC_buf) 612, respectively, within the buffer_conversion unit 610 through the XGMII 601. The RX CLK is a 162.25 MHz clock signal, and the RxD<31:0> and RXC<3:0> are a 32-bit parallel signal and a 4-bit parallel signal, respectively.

The RD_buf 611 and the RC_buf 612 are round robin type buffers which can independently perform the reading and writing of data. Further, the RD_buf 611 and the RC_buf 612 are a reception data buffer and a reception condition buffer, respectively, which store the RxD<31:0> and RXC<3:0> in parallel and are operated in a DDR manner in response to the RX_CLK information. In this case, the bit values of RxD<31:0> in the idle state when Ethernet frames are not received are idle data (that is, the values of RxD<7:0>, RxD<15:8>, RxD<23:16> and RxD<31:24> are 0x07), and all bit values of the RXC<3:0> are high (that is, 0xF).

The SOF_EOF_detection unit 613 detects the start and the end of an Ethernet frame by continuously checking the RxD<31:0> and the RXC<3:0> which are outputs of the RD_buf 611 and the RC_buf 612, respectively. That is, after the RxD<31:0> are idle data and all bit values of the RXC<3:0> are high, when the RxD<7:0> are frame start data (that is, 0xFB), and the RxD<15:8>, the RxD<23:16> and the RxD<31:24> are all preamble values (that is, 0xAA), and further the value of RXC<3:0> is 0x1, the SOF_EOF_detection unit 613 determines that normal Ethernet MAC frame data begin at the next data, if the following RxD<7:0>, RxD<15:8>, RxD<23:16> and RxD<31:24> are respectively preamble value, preamble value, preamble value, and Start of Frame Delimiter value (SFD, that is, 0xFB). At this time, the SOF_EOF_detection unit 613 transitions its 4 bit output states to high from low, thus informing the inverse conversion unit 615 and the DA_SA_FCS_detection unit 614 that the next RxD<31:0> are Ethernet MAC frame data starting from destination address (DA) information.

Four bit signals, which are outputs of the SOF_EOF_detection unit 613, correspond to RxD<7:0>, RxD<15:8>, RxD<23:16> and RxD<31:24>, respectively. In this case, if respective values of RxD<7:0>, RxD<15:8>, RxD<23:16> and RxD<31:24> are Ethernet frame information including checksum information (including error in the frame), the four bit signals are transitioned to high; otherwise, they are transitioned to low.

For example, if checksum information of an Ethernet frame is terminated at RxD<7:0> and RxD<15:8>, and RxD<23:16> represents a 10 gigabit Ethernet frame termination signal (that is, 0xFD), and further RxD<31:24> represents an idle state value (that is, 0x07), the output of the RC_buf 612 at this time is 0xC, and the output of the SOF_EOF_detection unit 613 is 0x3, thus indicating that the Ethernet frame is terminated at the RxD<15:8>.

Further, the inverse conversion unit 615 includes a round robin type buffer with a capacity greater than 8 bytes, which converts the RxD<31:0> received by the RD_buf 611 into four RxD<7:0> units and stores them. Therefore, when all output bits of the SOF_EOF_detection unit 613 are transitioned to high from low, the inverse conversion unit 615 converts frame start data, that is, 0xFB, into a preamble value.

Further, if the value of RXC<3:0> received by the RC_buf 612 is not 0x0 while all output bits of the SOF_EOF_detection unit 613 are high, the inverse conversion unit 615 checks RxD data corresponding to RXC<0>, RXC<1>, RXC<2> and RXC<3>. Therefore, if the RxD data represent an error signal, that is, 0xFE, the inverse conversion unit 615 sets a bit at a corresponding output position of the error_out unit 662, selected by the selector unit 631, to be high.

The inverse conversion unit 615 sets bits at corresponding output positions of the enable_out unit 663, selected by the selector unit 631 on the basis of information of the SOF_EOF_detection unit 613 for a period ranging from a preamble signal to a checksum, to be high.

Therefore, the selector unit 631 selects a specific port indicated by the cp unit 633, that is, one of the output_buffers 660-1 to 660-N, thus transmitting signal information RxD<7:0>, Rx_DV and RX_ER generated by the inverse conversion unit 615 or the IFG_insertion unit 632 to a corresponding output_buffer. In this case, it is assumed that the first output_buffer (that is, 660-1) is selected for convenience of description.

If all output bits of the SOF_EOF_detection unit 613 are transitioned to high from low, the DA_SA_FCS_detection unit 614 outputs the following 6 bytes to the port_comparison_control unit 621.

The DA_proc unit 622 is a unit operated such that destination addresses DAs and number information on other multiplexers having the DAs are stored, updated and deleted in the form of a table. Therefore, if a DA obtained by the DA_SA_FCS_detection unit 614 exists in the DA_proc unit 622, a frame having the DA is to be sent to other multiplexers (for examples, 420-2 to 420-m of FIG. 4). Further, if the DA does not exist in the DA_proc unit 622, a frame having the DA is an unknown frame or a frame to be sent to gigabit ports (for example, 460-1 to 460-k of FIG. 4). Therefore, if a multiplexer and a demultiplexer constitute a single pair, the DA_proc unit 622, the SA_proc unit 623, the SA_in unit 640 and the SA_out 650 are unnecessary.

The SA_proc unit 623 is a unit operated such that source addresses SAs are stored, updated and deleted in the form of a table. Therefore, if SA and FCS information are received from the DA_SA_FCS_detection unit 614 through the port_comparison_control unit 621, the SA_proc unit 623 transmits the SA, FCS information and its Frame_DEMUX number (in this case, 600-1) to other Frame_MUXes through the SA_out unit 650 by the operation of a DA_table 740 of FIG. 7. Further, the SA_proc unit 623 transmits the SA and its Frame_DEMUX number (in this case, 600-1) to other Frame_DEMUXes 600-2 to 600-N through the SA_out unit 650 at each set time by the operation of a SA_table 710 of FIG. 7.

Meanwhile, the port_comparison_control unit 621 of FIG. 6 receives information obtained from the DA_SA_FCS_detection unit 614, and PAUSE status information and remaining capacity information of respective output_buffers, transmitted from the output_buffers 660-1 to 660-N, and operates as follows.

1) The port_comparison_control unit 621 determines whether a 6-byte destination address DA obtained from the DA_SA_FCS_detection unit 614 exists in the destination address table (DA_table) (740 of FIG. 7) stored in the DA_proc unit 622. If the DA exists in the DA_table 740, the port_comparison_control unit 621 reads a corresponding Frame_MUX number stored together with the DA (for example, if the DA is DA2, MX-2 is selected in a GMX 742, so a second Frame_MUX is selected), and then transmits SA and checksum (FCS) information obtained from the DA_SA_FCS_detection unit 614 to a processing unit (that is, xmit_processing unit 932 of FIG. 9) of the corresponding Frame_MUX (second Frame_MUX 420-2 in FIG. 4) through the SA_out unit 650. Simultaneously, the port_comparison_control unit 621 revises aging status information of a DXA 744 corresponding to the DA2. Next, the port_comparison_control unit 621 selects an arbitrary output_buffer in an idle state among output_buffers 660-1 to 660-N. However, if all output_buffers 660-1 to 660-N are in use, the port_comparison_control unit 621 selects an output_buffer having the greatest remaining capacity and records information in the cp unit 633. Thereafter, the port_comparison_control unit 621 determines whether a corresponding SA exists in the column of a SAG 723 of the SA_table 710 of FIG. 7, and updates only aging status information in the entry of the column of a SXA 724 constituting a pair together with the SA, if the SA exists in the column of the SAG 723. On the contrary, if the SA does not exist, the port_comparison_control unit 621 adds the SA and the aging status information as a pair of new entries to the SAG 723 and the SXA 724, respectively, adds the same SA that added to the SAG 723 to a TSA 713, and increases the value of a NSA 712 by "1".

2) If a 6-byte destination address DA obtained from the DA_SA_FCS_detection unit 614 does not exist in the DA_table 740 stored in the DA_proc unit 622, the port_comparison_control unit 621 determines whether the DA exists in a GDA 731 of a use frequency table (HUT) 730. At this time, if the DA exists in the GDA 731, the port_comparison_control unit 621 selects a corresponding output_buffer in an OBN 732, and records information in the cp unit 633 (for example, if the DA obtained from the DA_SA_FCS_detection unit 614 is DA-3 in the GDA 731, OB-7 is selected, so a seventh output_buffer is selected).

3) If a 6-byte destination address DA obtained from the DA_SA_FCS_detection unit 614 does not exist in both the DA_table 740 stored in the DA_proc unit 622 and the GDA 731 of the HUT 730, the port_comparison_control unit 621 selects an arbitrary output_buffer in the idle state among the output_buffers 660-1 to 660-N. If all output_buffers are in use, the port_comparison_control unit 621 selects an output_buffer having the greatest remaining capacity, and records information in the cp unit 633. Thereafter, the port_comparison_control unit 621 adds the selected output_buffer number, the DA and aging information to the HUT 730 as new entries.

As described above, when the port_comparison_control unit 621 inputs a specific output_buffer number to the cp 633, the selector unit 631 transmits the Ethernet frame converted by the inverse conversion unit 615 to a specific output_buffer (one of the output_buffers 660-1 to 660-N), which is designated by the cp 633.

The IFG_insertion unit 632 adds an inter-frame gap (IFG) signal after the checksum of the Ethernet frame in the data_out unit 661, immediately after the selector unit 631 transmits the checksum of the Ethernet frame to the data_out unit 661. At this time, the IFG_insertion unit 632 sets the output values of the error_out unit 662 and the enable_out unit 663 at the same position as the IFG signal to be low.

The reception_clock generation (GRX_CLK_gen) unit 655 generates a 125 MHz GRX_CLK signal, provides the GRX_CLK signal to the data_out unit 661, the error_out unit 662 and the enable_out unit 663, and further outputs the GRX_CLK signal through the GMII 602.

Further, the data_out unit 661, the error_out unit 662 and the enable_out unit 663 are FIFO type buffers which store the RxD<7:0>, the RX_DV and RX_ER, respectively, through the selector unit 631. Further, they are operated in synchronization with the GRX_CLK signal outputted from the GRX_CLK_gen unit 665, and always output low signals while they are in empty states.

Figure 7:
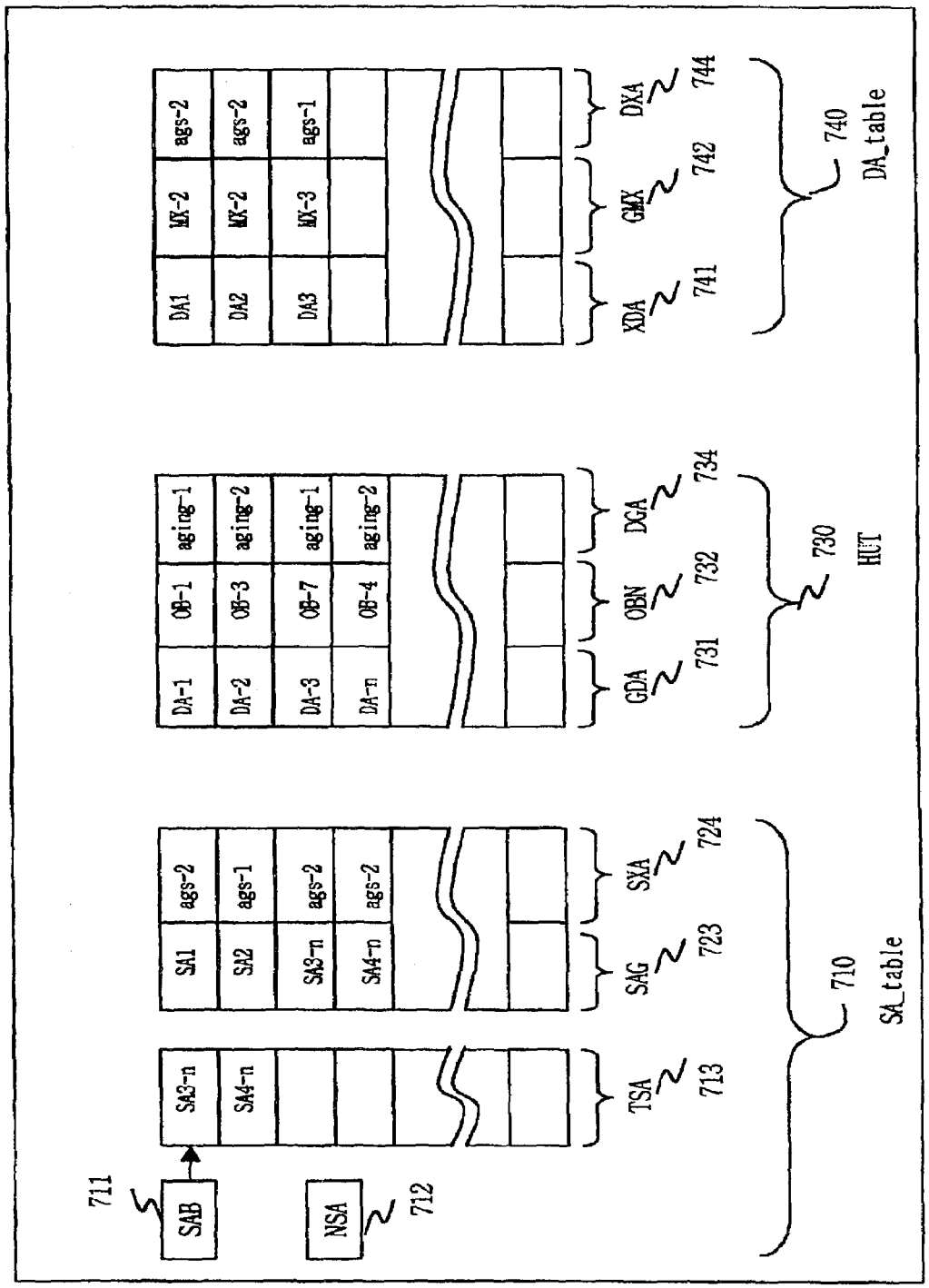
FIG. 7 is a view showing the construction of internal tables used in port analysis and control processing according to the present invention.

FIG. 7 is a view showing the construction of internal tables used in the port analysis and control processing of the present invention, and especially shows the construction of the internal tables used in the DA_proc unit 622 and the SA_proc unit 623. Referring to FIG. 7, the SA_table 710 is used in the SA_proc unit 623 of FIG. 6, the HUT 730 is used in the port_comparison_control unit 621, and the DA_table 740 is used in the DA_proc unit 622.

In FIG. 7, the GDA 731, OBN 732 and the DGA 734 represent destination addresses DAs, output_buffer numbers and aging times of respective frames. For example, if a destination address DA of a frame received by the Frame_DEMUX 600-1 of FIG. 6 is DA-2, the DA-2 corresponds to a second column of the GDA 731. Therefore, since information in the second column of the OBN 732 is OB-3, the received frame will be transmitted through the output_buffer 660-3 of FIG. 6 which is a third output_buffer. Further, aging-2 in a second column of the DGA 734 represents that a ternary of the DA-2, the OB-3 and the aging-2 which are entries in the second columns will be deleted from the HUT 730 after the aging-2 time. The object of the HUT 730 is to prevent the sequence of frames from deviating when the frames having the same destination address and different lengths and being received by the frame_DEMUX are transmitted to the same GbE PHY of FIG. 4 (for example, 460-1) through arbitrary output_buffers 660-1 to 660-N and the switch fabric chip set 450. Therefore, when new entries such as DA, OB and aging time information are generated, the aging time is determined by adding a time for which a frame having a maximum length stays in the output_buffer 660-1 of FIG. 6 to a maximum transmission delay time at the switch fabric chip set 450 (if the aging time is excessively short, a frame transmission sequence may be disturbed). Accordingly, even if an idle output_buffer which can transmit the received frames exists, a predetermined output_buffer must be used to transmit the received frames in consideration of the frame transmission sequence, thus dispersing the frames to prevent the frames from concentrating on a specific output_buffer.

In FIG. 7, the SAB 711 of the SA_table 710 is a pointer for indicating a start point of the TSA 713. The TSA 713 is a buffer for successively storing newly added SAs whenever new SAs are added to the SAG 723. The NSA 712 is the number of SAs stored in the TSA 713 at the present time.

Further, the SAG 723 and the SXA 724 are tables in which SAs of 10 gigabit Ethernet frames received through the XGMII 601 of FIG. 6 for respective certain times (aging times) are collected and stored. In this case, respective items of the SAG 723 represent different SAs. Further, different aging status values in the SXA 724 represent aging processing information of corresponding SAs at the present time. As described above, a source address SA of a frame received from the XGMII 601 of FIG. 6 is compared with those of the SAG 723. Therefore, if the same SA exists in the SAG 723, only information of the SXA constituting a pair together with the SA is revised. Further, if the same SA does not exist in the SAG 723, a pair of a new SA and aging status information are added to the SAG 723 and the SXA 724, and an item for the SA is also added to the TSA 713. Further, the TSA 713 transmits SAs, which are stored in the TSA 713 for each set period according to set periods, and a number of the SA_table 710 (that is, 1 because the Frame_DEMUX number is 600-1) to other Frame_DEMUXes 600-2 to 600-m through the SA_out unit 650 of FIG. 6, and then revises the value of the NSA 712 as "0".

Further, the DA_table 740 of FIG. 7 is comprised of a ternary of XDA 741, GMX 742 and XDA 744 respectively representing destination addresses DAs, Frame_DEMUX numbers, and aging status information. As described above, the DA_table 740 contains DA information representing that frames received through the XGMII 601 of FIG. 6 will be transmitted to other Frame_MUXes. Further, if different Frame_DEMUXes 600-2 to 600-m transmit SA information and Frame_DEMUX number information according to predetermined periods, the DA_proc unit 622 of FIG. 6 receives the information through the SA_in unit 640, adds the SA information to the XDA 741, and adds the Frame_DEMUX number information to the GMX 742. The DA_proc unit 622 further adds as many new pieces of aging status information as the number of SAs to the DXA 744.

In FIG. 7, SAs which are not used for a set period are deleted from the SAG 723 by the aging processing of the SXA 724 of the SA_table 710. Similarly to this, DAs which are not used for a set period are deleted from the XDA 741 by aging processing of the DXA 744 of the DA_table 740. Detailed methods and set periods related to the aging processing are previously described in detail in documents (for example, "The Switch Book, Ch. 2" written by Rich Seifert, etc.) according to the prior art.

Figure 8A:
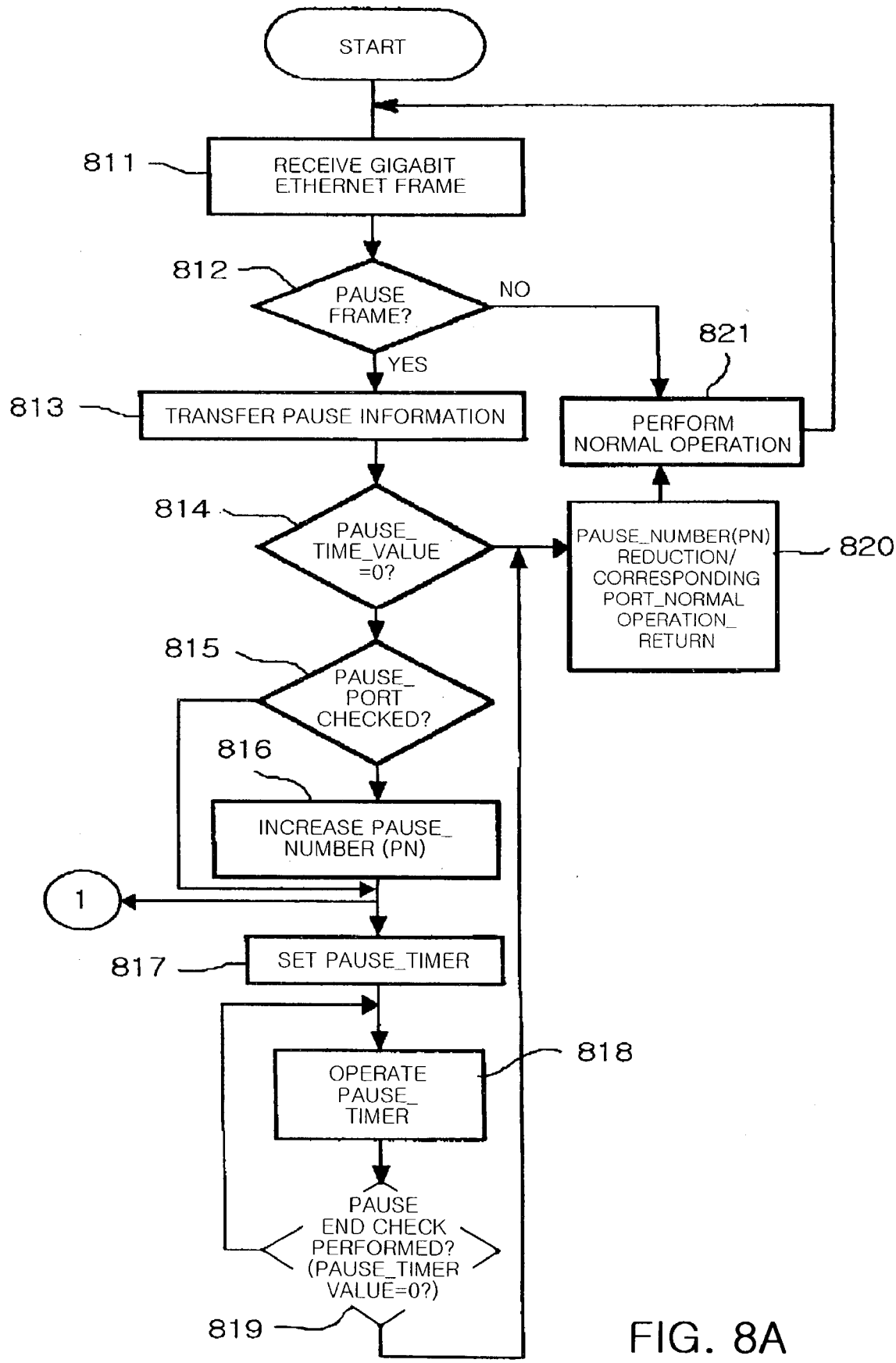
FIGS. 8a and 8b are flowcharts showing a PAUSE control process of the frame multiplexer/demultiplexer according to the present invention.
Figure 8B:
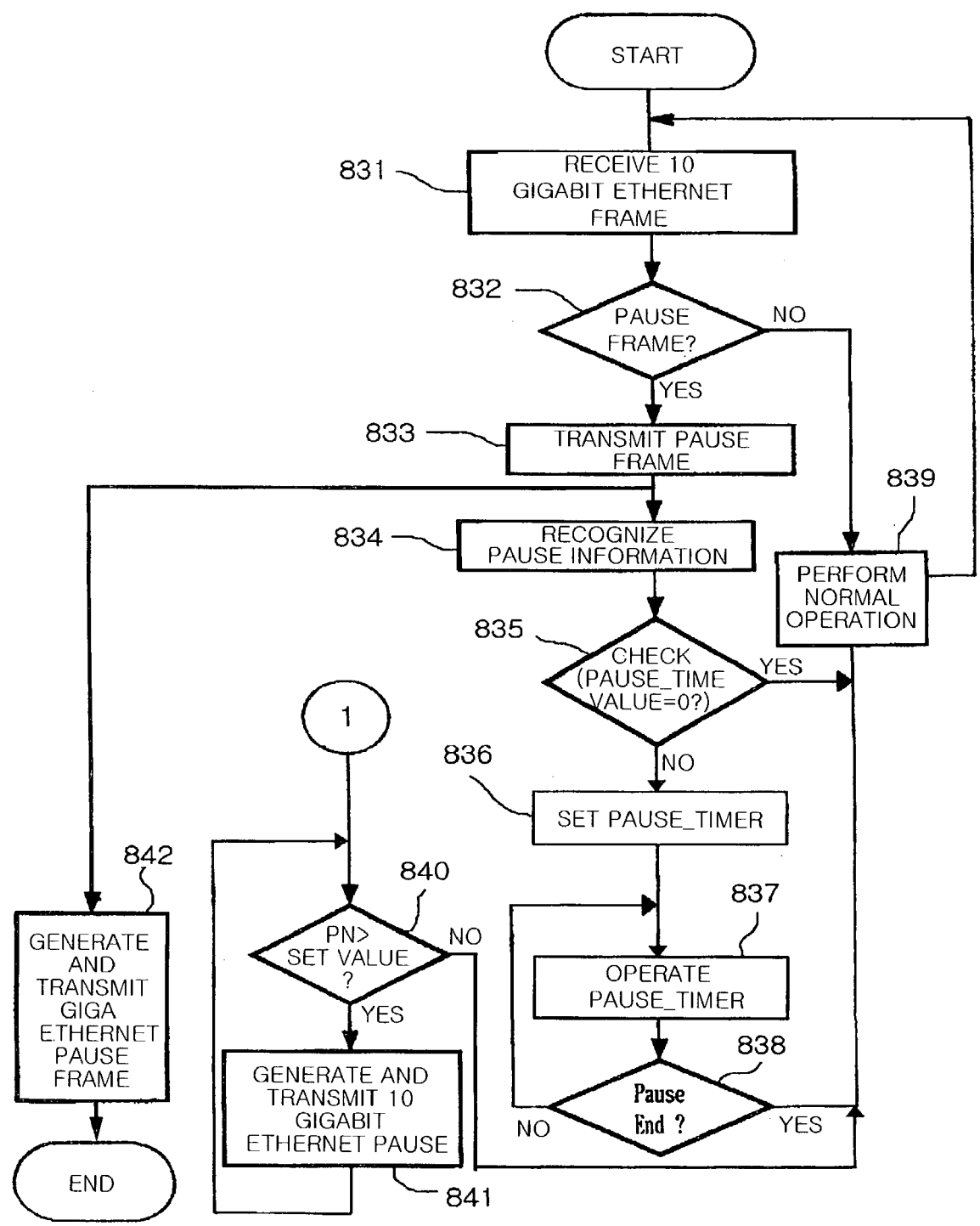

FIGS. 8a and 8b are flowcharts showing a PAUSE control process of the frame multiplexer/demultiplexer according to the present invention. In detail, FIG. 8a shows a PAUSE detection/processing procedure through GMII, and is a flowchart showing a procedure for detecting and processing PAUSE frames of gigabit Ethernet frames received/transmitted through the GMII. Further, FIG. 8b shows a PAUSE detection/processing procedure through XGMII, and is a flowchart showing a procedure for detecting and processing PAUSE frames of 10 gigabit Ethernet frames received/transmitted through the XGMII.

Referring to FIG. 8a, if gigabit Ethernet frames are received through the GMII 503 of FIG. 5 at step 811, the PAUSE_detection units 526-1 to 526-N checks whether each of the Ethernet frames inputted to the input_buffers 521-1 to 521-N is a PAUSE frame at step 812. If it is checked that each frame is not a PAUSE frame, a normal operation step 821 is performed to carry out a process for processing typical gigabit Ethernet frames. At this time, the PAUSE_detection units 526-1 to 526-N stand by until the input_buffers 521-1 to 521-N have completed the reception of next frames at step 821. However, if it is checked that each received frame is a PAUSE frame, various pieces of PAUSE information (PAUSE_info) input_buffer number, PAUSE time, etc.) are transferred to the PAUSE_processing units 546-1 to 546-N of corresponding output_buffers at step 813. Next, the PAUSE_processing units 546-1 to 546-N check whether a PAUSE_timer value of the PAUSE_info is "0" at step 814. If it is checked that the PAUSE_timer value is "0", a PAUSE_number (PN) reducing/corresponding port_ normal operation returning step is carried out at step 820. Further, if it is checked that the PAUSE_timer value is not "0", the PAUSE_processing units 546-1 to 546-N check PAUSE_ports at step 815. At the PAUSE_port checking step 815, it is checked whether each of corresponding output_buffers 546-1 to 546-N is in a PAUSE state. If it is checked that a corresponding output_buffer is in the PAUSE state, a PAUSE_timer_setting step 817 is performed to set a PAUSE_timer. Further, if it is checked that a corresponding output_buffer is not in the PAUSE state, a PAUSE_number (PN) is increased at step 816, and the PAUSE_timer_setting step 817 is performed. At the PAUSE_number (PN) increasing step 816, the number of output_buffers in PAUSE states at the present time (PAUSE buffer number:PN) is increased by "1". Further, at the PAUSE_timer_setting step 817, the value of a PAUSE_timer of a corresponding output_buffer is set to the PAUSE_timer value of the PAUSE_info. At this time, the PAUSE_number (PN) increased at step 816 is compared with a set value, as described at step 840 of FIG. 8b, thus determining whether 10 gigabit Ethernet PAUSE_ frames are generated and transmitted at step 841. These steps will be described later with reference to FIG. 8b.

Further, the PAUSE_timer is operated to reduce the PAUSE_timer value at regular intervals at step 818, and a PAUSE end check is performed at 819. At the PAUSE end check step 819, if the PAUSE_timer value is not "0", the PAUSE_timer_operation step 818 is performed again. Further, if the PAUSE_timer value is "0", the PAUSE_number (PN) reducing/corresponding port_normal operation_returning step 820 is performed. In this case, the PAUSE_number (PN) reducing/corresponding port_normal operation_returning step 820 is performed such that the number of output_ buffers in the PAUSE states at the present time is reduced by "1", and thereafter a corresponding port is set to be a normal operating state, not a PAUSE state, at step 821.

Referring to FIG. 8b, if a 10 gigabit Ethernet frame is received through the XGMII 502 of FIG. 5 at step 831, the PAUSE_detection unit 537 checks whether the frame inputted to the buffer_conversion unit 531 is a PAUSE frame at step 832. If it is checked that the received 10 gigabit Ethernet frame is not a PAUSE frame, a normal operation is performed to carry out a procedure for processing typical 10 gigabit Ethernet frames, and the PAUSE_detection unit 537 stands by until the buffer_conversion unit 531 has completed the reception of a next frame at step 839. However, if it is checked that the received 10 gigabit Ethernet frame is the PAUSE frame, the PAUSE_detection unit 537 generates a gigabit Ethernet PAUSE_frame and transmits the gigabit Ethernet PAUSE_frame to the PAUSE_processing units 546-1 to 546-N at step 842. Simultaneously, the PAUSE_detection unit 537 transmits the checked PAUSE frame to the PAUSE_processing unit 527 of FIG. 5 at step 833, and the PAUSE_processing unit 527 is operated. In this case, at the gigabit Ethernet PAUSE_frame generating/transmitting step 842, the gigabit Ethernet PAUSE frame is generated by the received PAUSE frame information and is transmitted through the GMII 504. Hereinafter, the operation of the above PAUSE_processing unit 527 is described in detail.

If PAUSE information (including PAUSE time, etc.) is recognized at step 834, the PAUSE_processing unit 527 checks whether a PAUSE_timer value is "0" at step 835. If it is checked that the PAUSE_timer value of the PAUSE_info is "0", a normal operation step 839 is performed. If it is checked that the PAUSE_timer value is not "0", a PAUSE_timer_setting step 836 is performed, thus setting the value of a PAUSE_timer of the selection_conversion unit 522 to be the PAUSE_timer value of the PAUSE_info, and proceeding to the PAUSE_timer_operating step 837. At the PAUSE_timer_operating step 837, the PAUSE_timer value is reduced at regular intervals. Next, a PAUSE end check is performed at step 838, such that the PAUSE_timer_operating step 837 is performed again if the PAUSE_timer value is not "0", while the normal operation step 839 is performed if the PAUSE_timer value is "0".

Meanwhile, it is checked whether the PAUSE_number (PN) increased at step 816 of FIG. 8a is greater than a set value at step 840. If it is checked that the increased PAUSE_number (PN) is greater than the set value, a 10 gigabit Ethernet PAUSE_frame is generated and transmitted at step 841. Thereafter, it is repeatedly checked whether the PAUSE_number (PN) increased at step 816 is greater than the set value according to the progress of FIG. 8a. However, if it is checked that the increased PAUSE_number (PN) is not greater than the set value, the normal operation step 839 is performed. At step 840, whenever the PAUSE_number (PN) is increased, the increased PAUSE_number (PN) is compared with the set value while the PAUSE control process of the frame multiplexer/demultiplexer according to the present invention is carried out, as shown in FIG. 8b. The step 840 is described in detail as follows. That is, the step 840 is to check at regular intervals whether the number of output_buffers 546-1 to 546-N in the PAUSE states at the present time (PN) is greater than a set reference value. At this time, if the number of output_buffers in the PAUSE states (PN) is less than the reference value, the selection_conversion unit 527 performs the normal operation step 839 for continuing its previous operation. On the contrary, if the number of output_buffers in the PAUSE states (PN) is greater than the reference value, the selection_conversion unit 522 generates/transmits a 10 gigabit Ethernet PAUSE_frame at step 841. At the 10 gigabit Ethernet PAUSE_frame generating/transmitting step 841, immediately after the selection_conversion unit 522 transmits the last 10 gigabit Ethernet frames, the selection_conversion unit 522 generates the PAUSE frame and transmits the PAUSE frame through the XGMII 501.

FIG. 9 is a block diagram showing the detailed construction of the frame multiplexer according to the present invention. GMII 902 and XGMII 901 of FIG. 9 are the same interfaces as the GMII 503 and XGMII 501 of FIG. 5. Further, in FIG. 9, an input_buffer 910-1, a selection_conversion unit 920, a selection_control unit 930, a multiplexer_status monitoring (MUX_STA) unit 980, a PAUSE_detection unit 916, and a SA_in unit 940 within a frame_multiplexer (Frame_MUX) 900-1 are the same functional units as the input_buffer 521-1, the selection_conversion unit 522, the selection_control unit 523, the multiplexer_status monitoring (MUX_STA) unit 528, the PAUSE_detection unit 526-1, and the SA_in unit 524 within the frame_multiplexer (Frame_MUX) 520-1 of FIG. 5, respectively. Therefore, the Frame_MUX 900-1 is the same as the Frame_MUX 520-1 of FIG. 5.

In FIG. 9, the input_buffer 910-1 is comprised of a data_in unit 911 connected to GTX_CLK and TxD<7:0> of the GMII 902, an error_in unit 912 connected to the GTX_CLK and Tx_ER of the GMII 902, an enable_in unit 913 connected to the Tx_EN of the GMII 902, a PAUSE_detection unit 916 connected to the PAUSE_processing unit 666 of FIG. 6, and a start_end_processing (SOF_EOF_processing) unit 918 connected to an port_selection_control unit 933. Further, the constructions and connections of the input_buffers 910-2 to 910-N are the same as those of the input_buffer 910-1. The selection_conversion unit 920 is comprised of a port_selection_storage unit 921 connected to the port_selection_control unit 933 and the input_buffers 910-1 to 910-N, a PAUSE_processing unit 926 connected to the PAUSE_detection unit 616 of FIG. 6, an IFG_insertion unit 923, a conversion_lane_generation unit 922 connected to TxD<31:0> and TXC<3:0> of the XGMII 901, and a transmission_clock_generation (TX_CLK_generation) unit 924 connected to TX_CLK of the XGMII 901. Further, the selection_control unit 930 is comprised of the port_selection_control unit 933 connected to the SOF_EOF_processing units 918, a transmission_status (xmit_status) unit 931 connected to the conversion_lane_generation unit 922, and a transmission_processing (xmit_processing) unit 932 connected to the SA_in unit 940. The multiplexer_status monitoring (MUX_STA) unit 980 outputs status information through the GMII and XGMII.

As described above, the gigabit Ethernet frame is formed such that a 125 MHz clock signal, that is, GTX_CLK, is received together with the TxD<7:0>, Tx_ER, and Tx_EN information through the GMII 902. The enable_in unit 913 is a buffer which stores Tx_EN condition information received through the GMII 902 in synchronization with the GTX_CLK signal, and transmits the Tx_EN information to the data_in unit 911, the error_in unit 912, and the SOF_EOF_processing unit 918. The data_in unit 911 and the error_in unit 912 are round robin type buffers which respectively store the TxD<7:0> and Tx_ER information received through the GMII 902. In this case, if the Tx_EN information is transitioned to high from low, the data_in unit 911 and the error_in unit 912 start to store the TxD<7:0> and Tx_EN information, respectively, in synchronization with the GTX_CLK signal, while if the Tx_EN information is transitioned to low from high, they recognize the end of the frames, and finish storing the TxD<7:0> and Tx_ER information. As described above, the data_in unit 911 and the error_in unit 912 are operated in synchronization with the GTX_CLK signal provided through the GMII 902, so an address of the error_in unit 912 can be known only if an address of the data_in unit 911 is known. An address of a buffer in which the data_in unit 911 starts to store the TxD<7:0> with the Tx_EN transitioned to high from low is a Start Of Frame (SOF). Further, an address of a buffer in which the data_in unit 911 stops storing the TxD<7:0> with the Tx_EN transitioned to low from high is an End Of Frame (EOF). Further, if several pieces of frame information remain in the data_in unit 911, several SOFs and EOFs may exist.

Therefore, the SOF_EOF_processing unit 918 temporarily stores an address of a buffer (that is, SOF) in which the data_in unit 911 starts to store data at a time when the output of the enable_in unit 913 is transitioned to high from low. At a time when the output of the enable_in unit 913 is transitioned to low from high, the SOF_EOF_processing unit 918 transmits to the port_selection_control unit 933 an address of a buffer (that is, EOF) in which the data_in unit 911 stops storing data, and a source address SA, a FCS (checksum) of the frame, and a input_buffer number 910-1 which are obtained from the frame completed in its reception at the present time. Further, the port_selection_storage unit 921 selects a specific input_buffer among input_buffers 910-1 to 910-N through information received from the port_selection_control unit 933, thus transmitting information stored in the data_in unit 911 and the error_in unit 912 to the conversion_lane_generation unit 922 using the SOF address and EOF address stored in the SOF_EOF_processing unit 918 or the xmit_processing unit 932.

Meanwhile, a TX_CLK_generation unit 924 of FIG. 9 generates a 156.25 MHz clock signal (TX_CLK), and provides the TX_CLK signal to the IFG_insertion unit 923, the conversion_lane_generation unit 922 and the XGMII 901. Further, the conversion_lane_generation unit 922 converts the data TxD<7:0> received from the data_in unit 911, of data read by the port_selection_storage unit 921 into 4-lane data of TxD<31:0> which meet XGMII standards.

That is, at a start point of the Tx_EN, a first byte signal of a preamble signal is transmitted, and is inputted as a Start signal to TxD<7:0> which is a first lane (lane 0) of TxD<31:0>. The following 6-byte data of the preamble are shifted, in order, to TxD<15:8>, TxD<23:16>and TxD<31:24> which are second, third and fourth lanes (lane 1, lane 2 and lane 3), respectively. Thereafter, the data of the preamble are shifted to the TxD<7:0>, TxD<15:8>and TxD<23:16> which are lane 0, lane 1 and lane 2, respectively, and SFD information is shifted to the TxD<31:24> which is a lane 3.

The next data are sequentially shifted in a round robin manner from lane 0 to lane 3 until the Tx_EN signal is transitioned to low from high. Thereafter, a termination signal (that is, 0xFD) is inserted into a next lane, and a value of TXC<3:0> corresponding to the termination signal is generated (that is, if the termination signal is inserted into the lane 2, a third bit of the TXC<3:0> is high, so the value of TXD<3:0> is 0x8).

As described above, 8-bit data of TxD<7:0> are converted into 32-bit parallel data of TxD<31:0>, the TXC<3:0> information is generated, and the TxD <31:0> and the TXC<3:0> are outputted to the XGMII 901 using the TX_CLK signal generated by the TX_CLK_generation unit 924. Further, an idle signal (that is, 0x07) is inserted into lanes which do not have data to be outputted any longer, and bits of TXC representing the conditions of corresponding lanes are set to be high, thus enabling the TxD<31:0> and TXC<3:0> to be outputted to the XGMII 901 using the TX_CLK signal. For example, if the idle signals are inserted into all lanes, all bits of the TXC are high, so the value of the TXC<3:0> is 0xF.

The IFG_insertion unit 923 inserts an inter-frame gap (IFG) between frames, and outputs the IFG to the XGMII 901, immediately after FCS information of the frame received from a specific input_buffer (for example, 910-1) selected by the port_selection_storage unit 921 is transmitted.

During the above process, the Tx_ER information of the GMII is processed as follows. Data error in a normal MAC frame is detected such that the Tx_ER is transitioned to high while the TX_EN signal is high. Therefore, while TxD<7:0> obtained during this error period are converted into TxD<31:0> of XGMII, an error value (that is, 0XFE) is inserted into a lane of XGMII to which TxD<7:0> of the GMII corresponding to the Tx_ER will belong, and a bit of TXC<3:0> corresponding to the lane is set to be high and then transmitted. If the corresponding lane is a lane 0, 0xFE value is inserted into the TxD<7:0> of XGMII, the value of TXC<3:0> is converted into 0x1, and the TxD<7:0> and the TXC<3:0> are transmitted to the XGMII. While the TX_EN is low, the value of each of lanes of TxD<31:0> is converted into a value 0x07 which is an idle signal value of XGMII, and outputted to the XGMII, regardless of a high or low state of the Tx_ER.

Further, while the conversion_lane_generation unit 922 outputs the TxD<7:0> of GMII stored in the port_selection_storage unit 921 and the IFG inserted by the IFG_insertion unit 923 to the XGMII 901, and while the transmission of data is stopped by the processing of the PAUSE_processing unit 926, a status signal 925 is high; otherwise, it is low. This status signal 925 is transmitted to the xmit_status unit 931 within the selection_control unit 930. The xmit_status unit 931 transmits the status signal to the port_selection_control unit 933.

Meanwhile, the SA_in unit 940 receives ternary information consisting of a SA, a FCS and a Frame_DEMUX number transmitted from each of the SA_out units 650 of other Frame_DEMUXes 600-2 to 600-m, and transfers the ternary information to the xmit_processing unit 932. During the reception of such ternary information, if a plurality of SA_in units 940 and the SA_out units 650 are connected to each other through a common bus, the SA_in unit 940 can be implemented such that it can receive only information related to a Frame_DEMUX corresponding to the SA_in unit 940 using an address filtering method. The xmit_processing unit 932 has tables, such as a source_address_table (SAT) 1120 and SA_sequence_tables 1110-1 and 1110-p of FIG. 11, which will be described later. The SAT 1120 and SA_sequence_tables 1110-1 and 1110-p store SA information and FCS (checksum) information, respectively, which are pieces of frame information of other Frame_DEMUXes, and inputted to all input_buffers 910-1 to 910-N of the Frame_MUX 900-1 by the information obtained through the SA_in unit 940. Therefore, the information stored in the form of tables is used to determine priority when the port_selection_control unit 933 selects a specific input_buffer. Further, the xmit processing unit 932 transmits the information in the tables to the port_selection_control unit 933 by request.

Figure 10:
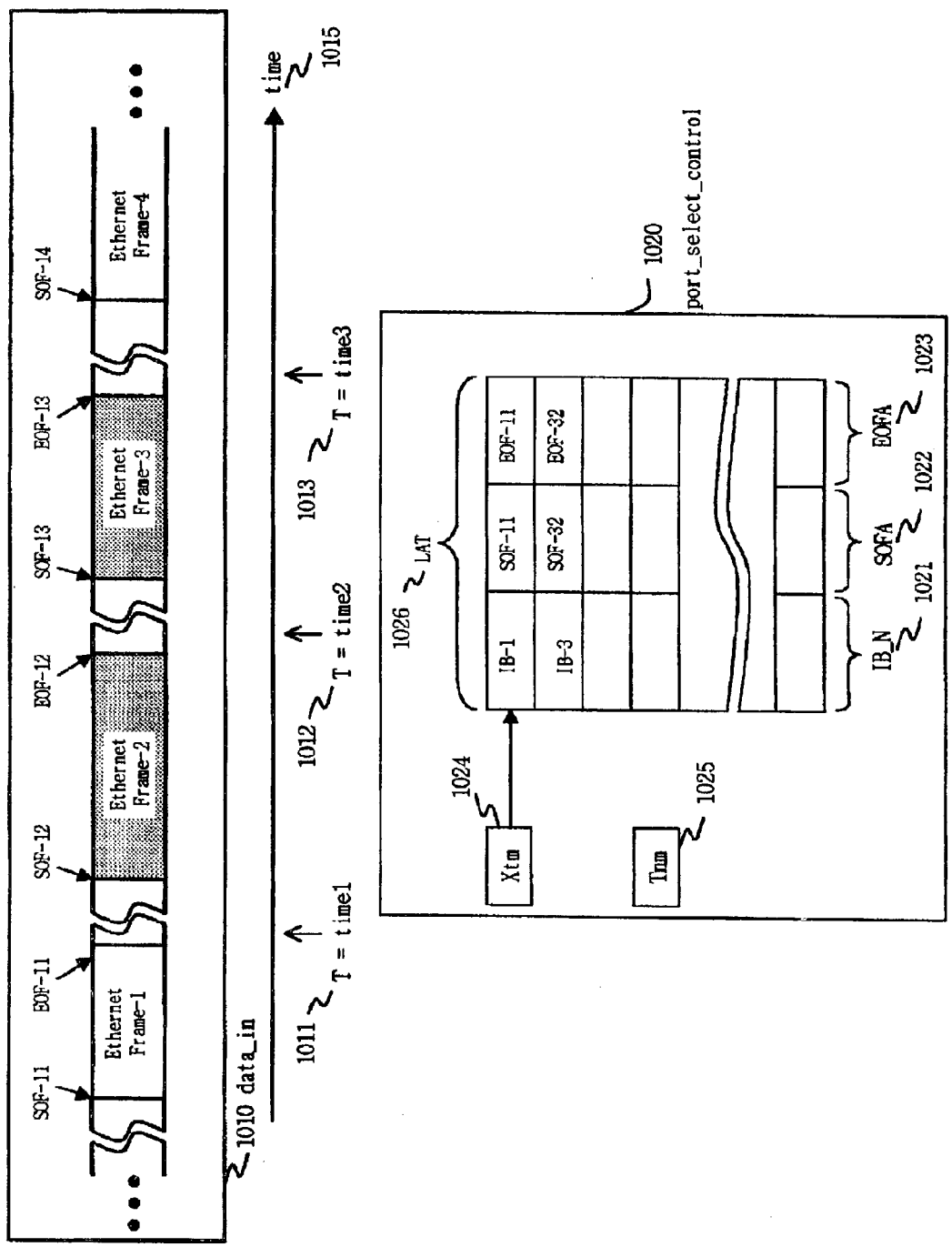
FIG. 10 is a view showing the construction of an internal table used by a port_selection_control unit according to the present invention.

The port_selection_control unit 933 has an internal table comprised of a round robin type buffer table (LAT) 1026 which consists of register ternaries each including an input_buffer number (IB_N) 1021, a SOFA 1022 and an EOFA 1023, a value (Tnm) 1025 which indicates the number of register ternaries in standby for processing at the present time, and a pointer (Xtm) 1024 which points an oldest register ternary of the register ternaries in standby for processing at the present time, as shown in FIG. 10. Therefore, when each of the SOF_EOF_processing units 918 included in the input_buffers 910-1 to 910-N transmits a SA, a FCS, a SOF, an EOF and an input_buffer number of a frame which has been completed in its reception, the port_selection_control unit 933 requests the xmit_processing unit 932 to determine whether a source of the frame is one of the Frame_DEMUXes 430-1 to 430-m of FIG. 4 or one of the GbE PHYs 470-1 to 470-k. Thereafter, the port_selection_control unit 933 receives the determination result from the xmit_processing unit 932, and increases a register value indicating the number of register ternaries in standby at the present time by "1" only if the frame completed in its reception is not a frame received from other Frame_DEMUXes. Further, the port_selection_control unit 933 adds the input_buffer number, the SOF and the EOF of the frame completed in its reception at the present time to the IB_N 1021, SOFA 1022 and EOFC 1023, respectively.

Figure 11:
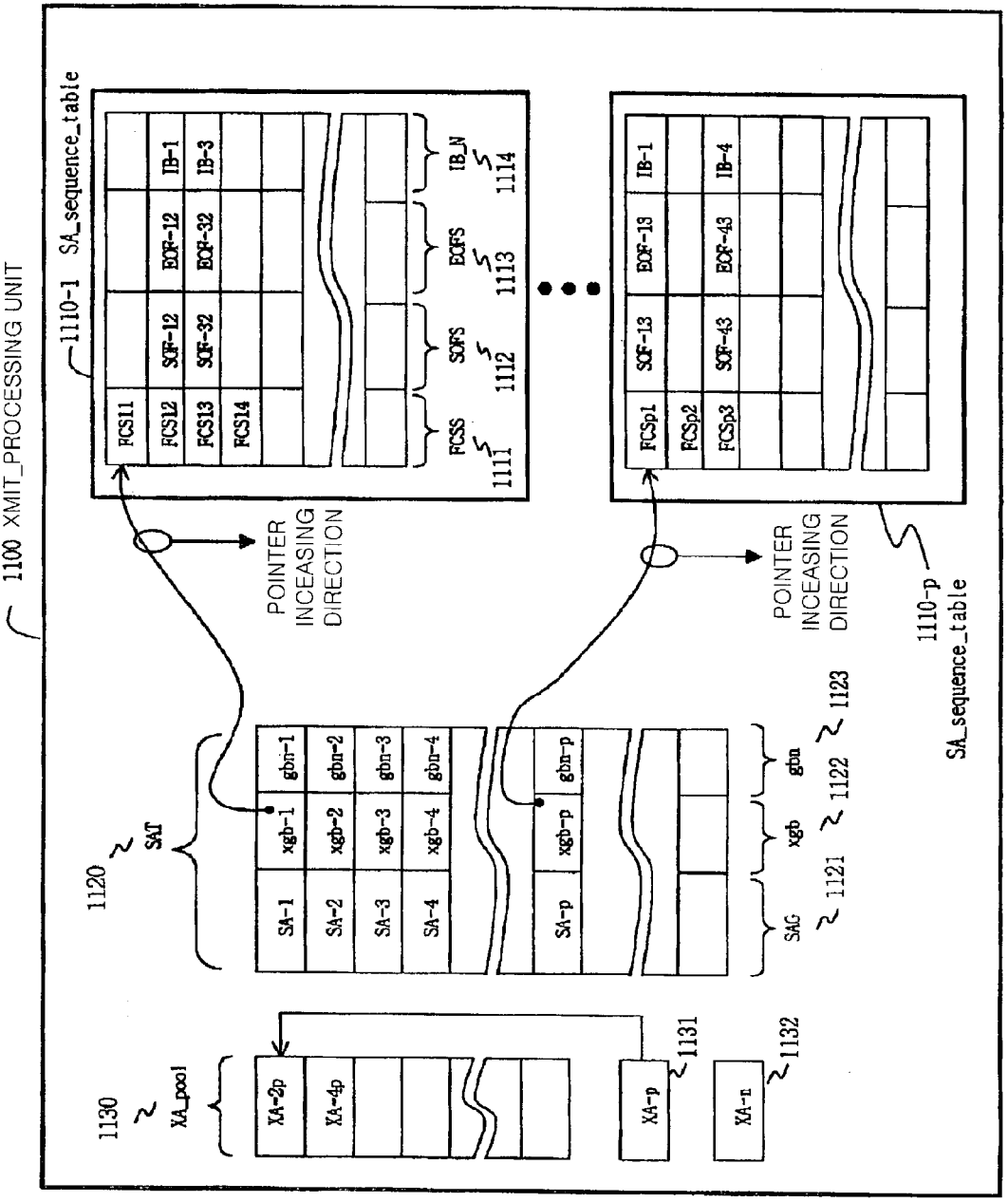
FIG. 11 is a view showing the construction and operation of internal tables used by a transmission_processing unit according to the present invention.

Further, when the output of the xmit_status unit 931 is transitioned to low from high, the port_selection_control unit 933 extracts a specific input_buffer number and SOF and EOF information from the xmit_processing unit 932 by the operations of an XA_pool 1130, a SAT 1120 and the SA_sequence_tables (source_sequence_tables) 1110-1 to 1110-p, and transmits the extracted information to the port_selection_storage unit 921, if the value of an XA-n 1132 of FIG. 11 included in the xmit_processing unit 932 is not "0". In this case, in the specific input_buffer (one of input_buffers 910-1 to 910-N), an Ethernet frame transmitted from other Frame_DEMUXes is stored, and the SOF and the EOF information designate the buffer addresses of the data_in unit 911 in which the Ethernet frame is stored. Further, if the value of the XA-n 1132 of FIG. 11 included in the xmit_processing unit 932 is "0", the port_selection_control unit 933 brings the value of the Tnm 1025. Only when a value representing the number of register ternaries in standby for processing at the present time is equal to or greater than "1", the port_selection_control unit 933 transmits the input_buffer number, SOF and EOF information which constitute a ternary of the local_address_table (LAT) 1026, pointed by the Xtm 1024, to the port_selection_storage unit 921, allows the Xtm 1024 to point a next ternary, and decreases the value of the Tnm 1025 by "1". Further, during the above process, if the values of the XA-n 1132 and the Tnm 1025 are "0", the port_selection_control unit 933 stands by until the SOF_EOF_processing unit 918 transmits SA, FCS, SOF, EOF and input_buffer number information.

FIG. 10 is a view showing the construction of the internal table used by the port_selection_control unit 933. In this case, a data_in unit 1010 of FIG. 10 is the same as the data_in unit 911 of FIG. 9. Further, an port_selection_control unit 1020 of FIG. 10 is also the same as the port_selection_control unit 933 of FIG. 9.

The data_in unit 1010 of FIG. 10 is depicted by laterally developing a round robin type buffer. In this case, the right side of FIG. 10 represents a later time, and t-now (time 1) 1011 represents a current time. As described above, the LAT 1026 is depicted by longitudinally developing a round robin type ternary table. In the input_buffer number (IB_N) 1021, the SOFA 1022 and the EOFA 1023, a number of an input_buffer which has completed the reception of a frame, SOF information representing a start address of the frame stored in the data_in unit 1010, and EOF information representing an end address of the frame stored in the data_in unit 1010 are stored, respectively. Further, the Tnm 1025 represents the number of ternaries in standby for processing at the present time, and Xtm 1024 has a pointer pointing an oldest ternary of ternaries in standby.

A time axis 1015 of FIG. 10 represents the flow of time, and T=time 1 1011, T=time 2 1012, and T=time 3 1013 are used to classify the operating states of the port_selection_control unit 1020 on the time axis 1015. As T moves to the right portion of the time axis 1015, a later time is indicated. Therefore, at the initial time when a frame does not exist in the data_in unit 1010, the LAT 1026 is empty, and the value of the Tnm 1025 is "0" even if the Xtm 1024 points any ternary of the LAT 1026. At the time T=time 1 1011 when the data_in unit 1010 receives a frame, the SOF_EOF_processing unit 918 sends SOF, EOF and input_buffer number information. At this time, only if the port_selection_control unit 1020 determines that the frame (that is, Ethernet Frame-1) is not a frame received from other Frame_DEMUXes by the response of the xmit_processing unit 932, the port_selection_control unit 1020 stores an end address EOF-11 of the frame (Ethernet Frame-1) stored in the data_in unit 1010 in the EOFA 1023, pointed by a pointer obtained by summing the pointer value of the Xtm 1024 and the value of the Tnm 1025, and further stores a number of an input_buffer storing the frame therein in the IB_N 1021 of the ternary corresponding to the EOFA 1023. Therefore, at T=time 1, the value of the Tnm 1025 is "0", so the EOF-11 and IB-1 are actually included in the ternary pointed by the Xtm 1024, as shown in FIG. 10. Next, the value of the Tnm 1025 is increased by "1". It is determined that Ethernet frames, that is, Ethernet Frame-2 and Ethernet Frame-3 completed in their receptions at T=time 2 1012 and T=time 3 1013, respectively, with the elapse of time are frames received from other Frame_DEMUXes by the response of the xmit_processing unit 932. Therefore, the port_selection_control unit 1020 does not use the IB_N 1021, the SOFA 1022, the EOFA 1023, the Xtm 1024, and the Tnm 1025 of the internal table (LAT) 1026. The latest time T=time 4 1014 is a time when the SOF_EOF_processing unit 918 senses that an Ethernet Frame-4 starts to be stored in the data_in unit 1010. At this time, a start address SOF-14 of the Ethernet frame-4 is temporarily stored in the SOF_EOF_processing unit 918.

FIG. 11 is a view showing the construction and operation of internal tables used by a transmission_processing (xmit_processing) unit 1100. The xmit_processing unit 1100 is the same as the xmit_processing unit 932 of FIG. 9. In FIG. 11, a XA_pool 1130 is depicted by longitudinally developing a round robin type buffer, wherein information stored later is located at the lower portion of the XA_pool 1130. XA-p 1131 represents the oldest information of plural pieces of information contained in the XA_pool 1130. Therefore, the X_Ap 1131 of FIG. 11 designates XA-2p of the XA_pool 1130. Further, XA-n 1132 represents the number of pieces of information contained in the XA_pool 1130, so the value of the XA-n 1132 is "2" in this case. The SAT 1120 is a ternary type table buffer comprised of SAG 1121, xgb 1122 and gbn 1123. Further, each of the SA_sequence_tables 1110-1 to 1110-p is a quadruplet type round robin table comprised of FCSS 1111, SOFS 1112, EOFS 1113 and IN_B 1114, wherein the SA_sequence_tables are depicted to be longitudinally developed in FIG. 11. There are as many SA_sequence_tables 1110-1 to 1110-p as the number of pieces of information contained in the SAG 1121 (since SA-1 to SA-p exist in the SAG 1121, the number of SA_sequence_tables is p). Further, the information of the xgb 1122 designates a first quadruplet of the FCSS 1111 of each of the SA_sequence_tables 1110-1 to 1110-p. The information of the gbn 1123 designates the number of FCSs in the FCSS 1111 of each of the SA_sequence_tables 1110-1 to 1110-p. Therefore, xgb-1 designates FCS11 of the SA_sequence_table 1110-1, and the value of gbn-1 is "4". The xgb-p designates FCSp1 of the SA_sequence_table 1110-p, and the value of gbn-p is "3".

At the initial operating state of the xmit_processing unit 1100, the XA_pool 1130 and the SAT 1120 are empty, and the value of the XA-n 1132 is "0". Since the SAT 1120 is empty, so the SA_sequence_tables 1110-1 to 1110-p do not exist. First, the xmit_processing unit 1100 that receives SA and FCS information from the SA_in unit 940 checks whether the received SA exists in the SAG 1121. If the SA does not exist in the SAG 1121, the xmit_processing unit 1100 forms a new SA_sequence_table (in the case of FIG. 11, p SA_sequence_tables already exist, so a new SA_sequence_table 1110-p+1 will be formed; however, at the initial state, a SA_sequence_table 1110-1 is formed). Thereafter, the xmit_processing unit 1100 adds the received SA to the SAG 1121, and allows the value of the xgb 1122 corresponding to the SA to designate a first position of FCSS 1111 of the newly formed SA_sequence_table. Further, the xmit_processing unit 1100 stores the received FCS in the FCSS 1111, and leaves SOFS 1112, EOFS 1113 and IB_N 1114 corresponding to the stored FCS empty. The value of the gbn 1123 corresponding to the stored FCS is set to be "1" (that is, the value of gbn-1 is set to be "1"). Accordingly, if the SA is received for the first time, a single ternary (consisting of SA-1, xgn-1 and gbn-1) exists in the SAT 1120. Successively, if the SA_940 transmits the same SA (that is, SA-1) as the previous SA and FCS information, the FCS received from the SA_in unit 940 is added to the FCSS 1111 of the SA_sequence_table, designated by the xqb 1122 in the same ternary as that of the SAG. In FIG. 11, FCS11, FCS12, FCS13 and FCS14 in the FCSS 1111 of the SA_sequence_table 1110-1 represent that four pieces of information having different FCS values and the same SA are sequentially received from the SA_in unit 940 and recorded. Therefore, the value of xgb-1 designates FCS11 in this case, but the value of gbn-1 increases whenever a new FCS is received, so it is "4". Further, when the SA_in unit 940 transmits new SA and FCS information which do not exist in the SAT 1120, a new SA_sequence_table is formed through the above-described method. Accordingly, referring to FIG. 11, different SAs, that is, SA-1 to SA-p exist in the SAT 1120, and p SA_sequence_tables 1110-1 to 1110-p are generated. Thereafter, in the case of the SA-1, four different FCSs are received from the SA_in unit 940, and in the case of the SA-p, three different FCSs are received from the SA_in unit 940.

As described above, while SAT ternaries and SA_sequence_tables are generated and added, the xmit_processing unit 1100 checks whether a received SA is one of SA-1 to SA-p contained in the SAG 1121, if the SA, a FCS, a SOF, an EOF, and an input_buffer number are received from the SOF_EOF_processing unit 918 through the port_selection_control unit 933 of FIG. 9. Therefore, the xmit_processing unit 110 transmits the checked result to the SOF_EOF_processing unit 918 through the port_selection_control unit 933. At this time, if the received SA does not exist in the SAG 1121, the xmit_processing unit 110 does not operate any longer. On the contrary, if the received SA is one of SAs existing in the SAG 1121, the xmit_processing unit 1100 finds the value of the xgb 1122 of a ternary to which the SA belongs, searches FCSS 1111 of a corresponding SA_sequence_table for the FCS, and respectively stores the received SOF, EOF, and input_buffer number in the SOFS 1112, the EOFS 1113 and the IB_N 1114 of a quadruplet to which the FCS received from the SOF_EOF_processing unit 918 belongs. During the above process, if the position of the FCSS 1111 is the same as an address designated by the xgb 1122, the position address of the FCSS 1111 is added to a location of the XA_pool 1130, obtained by summing the pointer value of the XA-p 1131 and the value of the XA-n 1132. Thereafter, the value of the XA-n 1132 is increased by "1". In the example of FIG. 11, the SA_sequence_table 1110-1 shows the results obtained by receiving SA=SA-1, SOF=SOF-12, EOF=EOF-12, and input_buffer number=IB-1, and SA=SA-1, SOF=SOF-32, EOF=EOF-32, and input_buffer number=IB-3, respectively, from the SOF_EOF_processing unit 918. During the above process, in the SA_sequence_table 1110-p, SOF-13, EOF-13 and IB-1 are stored in a quadruplet to which FCSp1 belongs, so the position address of the FCSp1 is added to the XA_pool 1130. At this time, if XA-2p and XA-4p already exist in the XA_pool 1130, as shown in FIG. 11, the position address of the FCSp1 is added after the XA-4p.

Further, when the xmit_processing unit 932 receives a transmission completion signal from the xmit_status unit 931 through the port_selection_control unit 933, the xmit_processing unit 932 checks the value of the XA-n 932. If the value of the XA-n 932 is "0", the xmit_processing unit 932 sends information indicating that there are no data to transmit to the port_selection_control unit 933 (for example, by simply adding a null value to an input_buffer number to return and transmitting the input_buffer number, as described above). Further, if the value of the XA-n 932 is equal to or greater than "1", the xmit_processing unit 932 sends the values of FCSS 1111, SOFS 1112, EOFS 1113 and the IB_N 1114 to the port_selection_control unit 933 by quadruplet position information stored in the XA_pool 1130, pointed by the XA-p 1131. Simultaneously, the xmit_processing unit 1100 decreases the value of the XA-n 1132 by "1", and increases the pointer of the XA-p 1131 by "1". Thereafter, the xmit_processing unit 923 decreases a corresponding value of the gbn 1123 by "1", and deletes a corresponding ternary of the SAG 1121, the xgb 1122 and the gbn 1123 in the SAT 1120 and further deletes a SA_sequence_table, if the value of the gbn 1123 becomes "0". In this case, the xmit_transmission unit 932 increases the pointer of the xgb 1122 to allow the pointer to point a next entry of FCSS 1111. For example, in FIG. 11, if FCSp1 is XA-2p of the XA_pool 1130, XA-p 1131 is a pointer value for pointing XA-4p, the value of the gbn-p is "2", and the xgb-p of the xgb 1122 is a value for designating FCSp2 of the SA_sequence_table 1110-p. Further, in FIG. 11, if FCSp3 is XA-2p of the XA_pool 1130, XA-p 1131 is a pointer value for pointing XA-4p, and the value of the gbn-p is "0". Therefore, in this case, a ternary consisting of the SA-p, the xgb-p and the gbn-p is deleted from the SAT 1120, and the SA_sequence_table 1110-1 is also deleted.

Further, in order to generate the SA_sequence_tables 1110-1 to 1110-p, there may be a method of previously generating SA_sequence_tables 1110-1 to 1110-p each with a predetermined size at an initial operating state, forming a pool for storing such table information, bringing an arbitrary usable SA_sequence_table from the pool if necessary, and using the SA_sequence_table. However, this method is only different in its implementation from the above method of the present invention.

Meanwhile, the above embodiments of the present invention can be written as programs executable by computer, and can be implemented through a digital computer which executes the programs using recording media readable by computers. Further, the configuration of data used in the embodiments of the present invention can be recorded in recording media readable by computers through several means. The recording media readable by computers include semiconductor memory devices (for example, RAM, NVRAM, CAM, etc.), magnetic storage media (for example, floppy disc, hard disc, etc.), optical recording media (for example, CD-ROM, DVD, etc.) and storage media for carrier waves (for example, transmission via the Internet).

As described above, the present invention provides an Ethernet switching apparatus and method for frame multiplexing and demultiplexing, which multiplexes variable-length high speed frames by using a frame multiplexing method, not a simple time division multiplexing (TDM) method, and by increasing an input bandwidth compared to an output bandwidth, thus obtaining a statistical multiplexing effect. Further, the present invention is advantageous in that standard interfaces are applied to input and output interfacing methods, thus pursuing the general purpose characteristics and implementing an Ethernet switch which obtains high speed (10 gigabit level) outputs while using a low speed (gigabit level) switch chip set.

Further, the present invention is advantageous in that it employs GMII and XGMII which are IEEE 802.3 standard interfaces between a gigabit Ethernet MAC and a 10 gigabit Ethernet transceiver, thereby using a general chip, and transmitting variable length Ethernet frames by multiplexing and demultiplexing the Ethernet frames without varying protocols. Further, the present invention is advantageous in that it can generate and transmit 10 gigabit Ethernet frames without using expensive and complicated functional units, such as a coprocessor for performing packet classification, traffic management, etc.

Especially, the present invention is advantageous in that it can correctly set a frame transmission sequence at each port only using GMII and XGMII which are IEEE 802.3 standard interfaces without information on a connecting path within a switch chip set when an Ethernet switch is implemented, thus enabling a general switch chip set to be used.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An Ethernet switching apparatus using frame multiplexing and demultiplexing, comprising:
   a plurality of frame demultiplexers for converting at least one 10 gigabit Ethernet frame received in a 10 Gigabit Media Independent Interface (XGMII) format into a plurality of gigabit Ethernet frames of a Gigabit Media Independent Interface (GMII) format, and outputting the gigabit Ethernet frames;
   a plurality of frame multiplexers for converting a plurality of gigabit Ethernet frames received in a GMII format into at least one 10 gigabit Ethernet frame of a XGMII format, and outputting the 10 gigabit Ethernet frame; and
   a switch fabric chip set provided with input and output interfaces using a GMII, and connected to the frame demultiplexers and the frame multiplexers in the GMII format, the switch fabric chip set outputting frames through an arbitrary usable one of a plurality of GMII ports connected to a corresponding frame multiplexer if the frames are transmitted to the corresponding frame multiplexer, the GMII connected to the frame multiplexers and the frame demultiplexers being set to support a full duplex mode; wherein the plurality of frame multiplexers and demultiplexers constitute a plurality of corresponding frame multiplexer/demultiplexer pairs;
   each of the frame demultiplexers within said plurality of multiplexer/demultiplexer pairs comprising,
   a buffer conversion unit for storing at least one 10 gigabit Ethernet frame received in the XGMII format, converting the 10 gigabit Ethernet frame into gigabit Ethernet frames, and detecting a PAUSE frame,
   a port analysis control unit for analyzing reception condition and destination addresses of the gigabit Ethernet frames, and analyzing an output port to output the gigabit Ethernet frames,
   a port selection unit for selecting an output port analyzed by the port analysis control unit and transmitting the gigabit Ethernet frames which are converted by the buffer conversion unit to the selected output port,
   a source output unit for transmitting source information of the 10 gigabit Ethernet frame, obtained from the port analysis control unit, to other plural frame multiplexer/demultiplexer pairs, and
   a plurality of output buffers for storing the gigabit Ethernet frames, received from the port selection unit, outputting the gigabit Ethernet frames through the GMII, receiving PAUSE information of the PAUSE frame detected by the buffer conversion unit and processing the PAUSE frame;
   each of the frame multiplexers within said plurality of multiplexer/demultiplexer pairs comprising,
   a plurality of input buffers for storing gigabit Ethernet frames received in the GMII format, detecting PAUSE frames and transmitting the PAUSE frames to corresponding output buffers of each of the frame demultiplexers,
   a selection control unit for receiving source address information of the Ethernet frames, and generating a control signal to select one of the input buffers,
   a selection conversion unit for sequentially selecting one of the received gigabit Ethernet frames in response to the control signal outputted from the selection control unit, converting the selected gigabit Ethernet frame into at least one 10 gigabit Ethernet frame for the XGMII, outputting the 10 gigabit Ethernet frame in the XGMII format receiving PAUSE information of the PAUSE frames detected by both the buffer conversion unit and the input buffers, and processing corresponding PAUSE frames, and
   a source input unit for transmitting source information of 10 gigabit Ethernet frames received from other plural frame multiplexer/demultiplexer pairs to both the selection control unit and the port analysis control unit.

2. The Ethernet switching apparatus using frame multiplexing and demultiplexing according to claim 1, wherein the buffer_conversion unit comprises:
   a reception_data unit for receiving at least one 10 gigabit Ethernet frame through the XGMII;
   a reception_condition unit for storing a condition of the received 10 gigabit Ethernet frame;
   a start_end_detection unit for detecting a start and end of the 10 gigabit Ethernet frame;
   a SA_DA_FCS_detection unit for detecting a destination address, a source address and a checksum of the 10 gigabit Ethernet frame;
   a PAUSE_detection unit for detecting a PAUSE frame in the 10 gigabit Ethernet frame; and
   an inverse conversion unit for converting the 10 gigabit Ethernet frame into gigabit Ethernet frame.

3. The Ethernet switching apparatus using frame multiplexing and demultiplexing according to claim 2, wherein the reception_data unit and reception_condition unit are constructed in a round robin format, designed to independently perform reading and writing of data, and operated in a double data rate manner according to a 165.25 MHz clock signal.

4. The Ethernet switching apparatus using frame multiplexing and demultiplexing according to claim 2, wherein the start_end_detection unit transmits detection results for the start and end of the 10 gigabit Ethernet frame to both the inverse conversion unit and the SA_DA_FCS_detection unit, immediately after reception of the 10 gigabit Ethernet frame is completed.

5. The Ethernet switching apparatus using frame multiplexing and demultiplexing according to claim 2, wherein the SA_DA_FCS_detection unit transmits the destination address, the source address and the checksum of the 10 gigabit Ethernet frame to the port_analysis_control unit, immediately after the inverse conversion unit converts the 10 gigabit Ethernet frame into gigabit Ethernet frames.

6. The Ethernet switching apparatus using frame multiplexing and demultiplexing according to claim 1, wherein the port_analysis_control unit comprises:
a destination_processing unit for receiving source addresses from other frame demultiplexers through the source_input unit, and storing and processing the source addresses in the form of a table;
a port_comparison_control unit for receiving the destination address, the source address and the checksum from the buffer_conversion unit, checking an internal destination address_table to add a corresponding frame multiplexer number to the destination address_table, and comparing the received destination address with those in the destination address_table to select an output_buffer which is not in a PAUSE state; and
a source_processing unit for storing and processing the destination address, the sources address, the checksum and the frame multiplexer number received from the port_comparison_control unit in the form of a table, and transmitting the information to the source_output unit according to set periods.

7. The Ethernet switching apparatus using frame multiplexing and demultiplexing according to claim 6, wherein:
the destination_processing unit has a ternary type destination address_table constructed such that the received source address and the frame demultiplexer number are converted into a destination address and a frame multiplexer number, and aging information is added to the destination address and the frame multiplexer number;
if the port_comparison_control unit sends a destination address, the destination_processing unit checks the destination address_table; and
if a corresponding ternary having the received destination address exists in the destination address_table, the destination_processing unit transmits frame multiplexer information stored in the ternary to the port_comparison_control unit, and revises aging information stored in the ternary, and
if a corresponding ternary having received destination address does not exist in the destination address_table, the destination_processing unit transmits information indicating that a ternary having the destination address does not exist to the port_comparison_control unit.

8. The Ethernet switching apparatus using frame multiplexing and demultiplexing according to claim 6, wherein:
the source_processing unit comprises a two-tuple type source address_table having a source address and aging information, a new_address buffer for storing new source addresses, a field for indicating the number of source addresses stored in the new_address buffer, and a pointer for pointing a start point of the new_address buffer;
the source_processing unit transmits the pieces of information received from the port_comparison_control unit to the source_output unit, and checks the source address_table; and
if a corresponding two-tuple having the received source address exists in the source address_table, the source_processing unit revises aging information stored in the corresponding two-tuple, and if a corresponding two-tuple having the received source address does not exist in the source address_table, the source_processing unit adds the received source address and aging information to the source address_table, adds the received source address to the new_address buffer, and increases the number of source addresses stored in the new_address buffer by "1".

9. The Ethernet switching apparatus using frame multiplexing and demultiplexing according to claim 8, wherein the source_processing unit adds frame demultiplexer numbers to the new_address buffer in which new source addresses are stored according to set periods, and transmits the source addresses and the frame demultiplexer numbers to other frame demultiplexers through the source address_output unit by the number of source addresses stored in the new_address buffer.

10. The Ethernet switching apparatus using frame multiplexing and demultiplexing according to claim 6, wherein:
the port_comparison_control unit comprises a ternary type port_frequency_table having a destination address, an output_buffer number and aging information;
if a destination address, a source address, checksum information and a frame multiplexer number are received from the buffer_conversion unit, the port_comparison_control unit requests a frame multiplexer number from the destination_processing unit by transmitting the destination address to the destination_processing unit;
if the destination_processing unit sends a corresponding frame multiplexer number, the port_comparison_control unit adds the frame multiplexer number to the information received from the buffer_conversion unit, transmits the added information to the source_processing unit, selects a specific output_buffer, and transmits selected output_buffer information to the port_selection unit, and
if the destination_processing unit sends information indicating that a corresponding frame multiplexer number does not exist, the port_comparison_control unit checks whether a ternary having the received destination address exists in the port_frequency_table;
if a ternary having the received destination address exists in the port_frequency_table, the port_comparison_control unit revises aging information stored in the ternary and transmits the stored destination address and output_buffer information to the port_selection unit, and
if a ternary having the received destination address does not exist in the port_frequency_table, the port_comparison_control unit selects a specific output_buffer, transmits the selected output_buffer information to the port_selection unit, and adds a ternary comprised of the destination address, the output_buffer number and aging information to the port_frequency_table.

11. The Ethernet switching apparatus using frame multiplexing and demultiplexing according to claim 10, wherein the port_comparison_control unit selects a specific buffer by selecting an arbitrary idle output_buffer among output_buffers which are not in a PAUSE state, and selecting an output_buffer having the greatest remaining capacity if there is no idle output_buffer.

12. The Ethernet switching apparatus using frame multiplexing and demultiplexing according to claim 11, wherein the output_buffers each comprise:
a data_output unit for storing each of gigabit Ethernet frames received from the port_selection unit as 8-bit parallel data;
an error_output unit for storing an error condition of the stored data;

an enable_output unit for storing an enable condition of the stored data;

a PAUSE_processing unit for receiving PAUSE information of a PAUSE frame detected by a corresponding input_buffer of the input_buffers and processing the PAUSE frame; and transmission_clock_generation unit for generating a transmission clock signal and providing the transmission clock signal to the data_output unit, the error_unit and the enable_output unit.

13. The Ethernet switching apparatus using frame multiplexing and demultiplexing according to claim 12, wherein the data_output unit, the error_output unit, and the enable_output unit are constructed in a First-In First-Out (FIFO) format, and are operated in synchronization with the transmission clock signal.

14. The Ethernet switching apparatus using frame multiplexing and demultiplexing according to claim 1, wherein the port_selection unit comprises:

a selector unit for receiving the gigabit Ethernet frames which are converted by the buffer_conversion unit, and selecting one of the plural output_buffers; and an IFG_insertion unit for generating an inter-frame gap signal and transmitting the inter-frame gap signal to the selector unit;

wherein the port_selection unit includes port information of an output_buffer selected at the present time.

15. The Ethernet switching apparatus using frame multiplexing and demultiplexing according to claim 1, wherein the input_buffers each comprises:

an enable_input unit for storing an enable condition of each of the received gigabit Ethernet frames;

a data_input unit for storing each of the received gigabit Ethernet frames in parallel by 8 bits;

an error_input unit for storing an error generation condition of each of the received gigabit Ethernet frames;

a PAUSE_detection unit for determining whether a frame received immediately after a FCS of each of the gigabit Ethernet frames is received is a PAUSE frame, and transmitting PAUSE information of the PAUSE frame to a corresponding output_buffer so as to process the PAUSE frame, if the received frame is the PAUSE frame; and a start_end_processing unit for storing and processing information indicating start and end of each of the gigabit Ethernet frames.

16. The Ethernet switching apparatus using frame multiplexing and demultiplexing according to claim 15, wherein the start_end_processing unit is operated such that, if an end of frame (EOF) of each gigabit Ethernet frame inputted to the data_input unit is detected, the start_end_processing unit transmits a source address and checksum information of the frame, address information (SOF and EOF), which indicates start and end of the frame, and an input_buffer number to the selection_control unit.

17. The Ethernet switching apparatus using frame multiplexing and demultiplexing according to claim 15, wherein the data_input unit and the error_input unit are constructed in a round robin format, and store data inputted in synchronization with an input clock signal from a time when a condition of the enable_input unit is transitioned to high from low, and stops storing data by recognizing an end of a corresponding frame, if the condition of the enable_input unit is transitioned to low from high.

18. The Ethernet switching apparatus using frame multiplexing and demultiplexing according to claim 1, wherein the selection_conversion unit comprises:

a port_selection_storage unit for selecting an input_buffer in response to information outputted from the selection_control unit, and storing a gigabit Ethernet frame and its status information received from the selected input_buffer;

a conversion_lane_generation unit for converting the gigabit Ethernet frame stored in the port_selection_storage unit into a 10 gigabit Ethernet frame for XGMII;

an IFG_insertion unit for generating an inter-frame gap signal and inserting the inter-frame gap signal into the conversion_lane_generation unit;

a PAUSE_processing unit for receiving PAUSE frame information detected by a buffer_conversion unit of a corresponding frame demultiplexer, and processing a corresponding PAUSE frame; and a transmission_clock_generation unit for generating a transmission clock signal for the XGMII, and providing the transmission clock signal for the XGMII to the conversion_lane_generation unit and the IFG_insertion unit.

19. The Ethernet switching apparatus using frame multiplexing and demultiplexing according to claim 18, wherein the IFG_insertion unit inserts the inter-frame gap signal into the conversion_lane_generation unit immediately after the conversion_lane_generation unit processes a single gigabit Ethernet frame stored in the port_selection_storage unit.

20. The Ethernet switching apparatus using frame multiplexing and demultiplexing according to claim 1, wherein the selection_control unit comprises:

a transmission_status unit for receiving information on a transmission status signal from the selection_conversion unit and storing the transmission status signal information;

a transmission_processing unit for receiving source information and checksum information from the source_input unit and processing the source information and the checksum information; and a port_selection_control unit for selecting a specific input_buffer using information indicating a start and an end of a frame received from each of input_buffers, the transmission status signal information outputted from the transmission_status unit, and the source information and the checksum information outputted from the transmission_processing unit.

21. The Ethernet switching apparatus using frame multiplexing and demultiplexing according to claim 20, wherein the transmission_status unit transmits corresponding transmission status signal information to the port_selection_control unit by recognizing a time when transmission of the inter-frame gap signal has been completed, if a current frame is not a PAUSE frame processed by the selection_conversion unit.

22. The Ethernet switching apparatus using frame multiplexing and demultiplexing according to claim 20, wherein the port_selection_control unit comprises a round robin type local_address_table comprised of ternaries having input_buffer numbers, frame start addresses and frame end addresses, and further comprises a field for indicating the number of ternaries in standby for processing at the present time, and a pointer for pointing an oldest ternary among the ternaries in standby in the local_address_table.

23. The Ethernet switching apparatus using frame multiplexing and demultiplexing according to claim 20, wherein:

the port_selection_control unit checks whether a source address of a frame received from each of the input_ buffers exists in ternaries in a source_address_table included in the transmission_processing unit; and if the received source address exists in the source_address_table, the port_selection_unit transmits a checksum, a SOF, an EOF, an input_buffer number and the received source address to the transmission_processing unit, and if the received source address does not exist in the source_address_table, the port_selection_unit adds an input_buffer number, a SOF and an EOF to the local_address_table as a ternary, and increases the number of ternaries in standby for processing at the present time by "1".

24. The Ethernet switching apparatus using frame multiplexing and demultiplexing according to claim 20, wherein:

the transmission_processing unit is operated such that, if the source_input unit sends a source address and a FCS, the transmission_processing unit checks whether a source address_ternary corresponding to the sent source address exists in the source_address_table;

if the source_address ternary exists in the source_address table, the transmission_processing unit increases FSC number information gbn of the source_address ternary by "1", and stores the FCS sent from the source_input unit in the FCSS at a position of a value of the FCS number information gbn of a source_sequence_table, pointed by the pointer xgb, and if the source_address ternary does not exist in the source_address table, the transmission_processing unit adds a new ternary to the source_address_table to generate a new source_sequence_table, allows the xgb of the new ternary to designate a first quadruplet of the newly generated source_sequence_table, sets a value of the gbn of the new ternary to "1", and stores the FCS sent from the source_input unit in FCSS of a first quadruplet of the newly generated source_sequence_table.

25. The Ethernet switching apparatus using frame multiplexing and demultiplexing according to claim 20, wherein the transmission_processing unit comprises:

a round robin type XA_pool for storing information designating addresses of output_buffers in standby for transmission;

an XA-p pointer for pointing oldest information of plural pieces of information stored in the XA_pool;

an XA-n for indicating the number of plural pieces of information stored in the XA_pool;

one or more round robin type source_sequence_tables in which FCSS for storing checksum information(FCS) of frames, SOF and EOF for respectively representing start and end addresses of the frames, and input_buffer numbers are stored in the form of a quadruplet; and a source_address_table in which a source address, a pointer xgb, and a field for indicating the number gbn of FCSs of each of the source_sequence_tables stored at the present time are stored in the form of a ternary.

26. The Ethernet switching apparatus using frame multiplexing and demultiplexing according to claim 25, wherein the transmission_processing unit is operated such that, if the port_selection_control unit sends a source address, a FCS, a SOF, an EOF, and an input_buffer number, the transmission_processing unit checks whether a source_address ternary corresponding to the sent source address exists in the source_address_table, if the source_address ternary exists in the source_address table, the transmission_processing unit checks FCSS of a source_sequence_table pointed by the pointer xgb of the ternary, and stores the SOF, the EOF, and the input_buffer number in a quadruplet at a position where the FCS sent from the port_selection_control unit exists, and if the position of the FCS of the quadruplet is the same as that of a FCS pointed by the pointer xgb, the transmission_processing unit increases a value of the XA-n, and adds the pointer xgb to a position of the XA_pool, designated by a value of the XA-p+the XA-n.

27. The Ethernet switching apparatus using frame multiplexing and demultiplexing according to claim 25, wherein the transmission_processing unit is operated such that, if the number indicated in the XA-n is equal to or greater than "1", the port_selection_control unit brings a FCS, a SOF, an EOF and an input_buffer number from a source_sequence_table at a position designated by a value of the XA_pool, pointed by the pointer XA-p, allows the pointer xgb of the source_address_table, which points the FCS brought by the port_selection_control unit, to point a next FCS, and reduces the value of the gbn of a ternary having the xgb by "1", and if the value of the gbn is "0", the transmission_processing unit deletes a source_sequence_table pointed by the pointer xgb of the source_address_table, and removes the ternary having the gbn from the source_address_table.

28. The Ethernet switching apparatus using frame multiplexing and demultiplexing according to claim 25, wherein the transmission_processing unit is operated such that, if information indicating that a next frame can be transmitted is obtained from the transmission_status unit, and the number in the XA-n is equal to or greater than "1", the port_selection_control unit brings a FCS, a SOF, an EOF and an input_buffer number from a source_sequence_table at a position designated by a value stored in the XA_pool, which is pointed by the pointer XA-p, and transmits the brought information to the selection_conversion unit, if the number in the XA-n is "0", the transmission_processing unit checks the number of ternaries Tnm, if the number in the XA-n is "0", and the number of ternaries Tnm is equal to or greater than "1", the transmission_processing unit transmits an input_buffer number, a SOF and an EOF from a ternary pointed by a pointer for pointing an oldest ternary in the local_address_table in standby to the selection_conversion unit, increases the pointer to point a next ternary, and decreases the number of ternaries Tnm in standby for processing at the present time by "1", and if the number in the XA-n is "0", and the number of ternaries Tnm is "0", the port_selection_control unit stands by until a specific input_buffer unit transmits a source address, a checksum, a SOF, an EOF and an input_buffer number.

29. An Ethernet switching method using frame multiplexing and demultiplexing in an Ethernet switching apparatus comprising a plurality of frame demultiplexer and multiplexer pairs, comprising the steps of:

performing frame demultiplexing; and performing frame multiplexing;

wherein the frame demultiplexing comprises for each of said plurality of multiplexer/demultiplexer pairs the steps of, 1) storing at least one 10 gigabit Ethernet frame for 10 Gigabit Media Independent Interface (XGMII) received in a XGMII format and converting the 10 gigabit Ethernet frame into gigabit Ethernet frames for gigabit Media Independent Interface (GMII) by a buffer_conversion unit;

2) analyzing destinations and reception conditions of the gigabit Ethernet frames and selecting a port to output the gigabit Ethernet frames by a port_analysis_control unit, 3) receiving source information of a 10 gigabit Ethernet frame from each of other frame demultiplexers to form a destination address table in the port_analysis_control unit by a source_input unit, and transmitting a destination address, a source address and a frame demultiplexer number of the frame received from the buffer_conversion unit to the source_input unit by the source_output unit, 4) transmitting the gigabit Ethernet frames converted by the buffer_conversion unit to a specific port by a port_selection unit, and 5) storing and outputting the plural gigabit Ethernet frames selected by the port_selection unit by a plurality of output_buffers;

wherein the frame multiplexing comprises for each of said plurality of multiplexer/demultiplexer pairs the steps of, 6) storing gigabit Ethernet frames received in the GMII format, and detecting PAUSE frames by a plurality of input_buffers, 7) transmitting source address information of 10 gigabit Ethernet frames, received from other multiplexer/demultiplexer pairs, to a selection_control unit by the source_input unit, 8) receiving the source address information, and generating a control signal for selecting one of the plural input_buffers by the selection_control unit, and 9) selecting one of a plurality of gigabit Ethernet frames in response to the control signal, converting the selected gigabit Ethernet frame into at least one 10 gigabit Ethernet frame, and outputting the 10 gigabit Ethernet frame by a selection_conversion unit.

30. The Ethernet switching method using frame multiplexing and demultiplexing according to claim 29, wherein the step 1) comprises the steps of:

10) receiving and storing at least one 10 gigabit Ethernet frame inputted through the XGMII by a reception_data unit;

11) storing a condition of the received 10 gigabit Ethernet frame by a reception_condition unit;

12) detecting a start and an end of the 10 gigabit Ethernet frame by a start_end_detection unit;

13) detecting a destination address of the received 10 gigabit Ethernet frame by a destination_address_detection unit;

14) detecting a PAUSE frame of the received 10 gigabit Ethernet frame and processing the PAUSE frame by both a PAUSE_detection unit and a PAUSE_processing unit; and 15) converting the 10 gigabit Ethernet frame into gigabit Ethernet frames by an inverse conversion unit.

31. The Ethernet switching method using frame multiplexing and demultiplexing according to claim 30, wherein the step 12) comprises the steps of:

16) determining whether data of the 10 gigabit Ethernet frame stored in the reception_data unit are idle data;

17) determining whether all condition values stored in the reception_condition unit are "1";

18) determining whether the lower 8 bit values of the received Ethernet frame data are frame start data, the remaining values are preamble data, and the value of the reception_condition unit is "1", if the stored Ethernet frame data are idle data, and the stored condition values are all "1" at steps 16) and 17); and 19) recognizing data, received to the reception_data unit after next frame data, as normal Ethernet Media Access Control frame data in the case where the lower 8 bit values of the next frame data received to the reception_data unit are frame start data and the remaining values are preamble data, if it is determined that the lower 8 bit values of the received Ethernet frame data are frame start data, the remaining values are preamble data, and the value of the reception_condition unit is "1" at step 18).

32. The Ethernet switching method using frame multiplexing and demultiplexing according to claim 30, wherein the step 14) comprises the steps of:

20) detecting a PAUSE frame from each of gigabit Ethernet frames received in the GMII format by a PAUSE_detection unit included in each of the input_buffers;

21) processing the PAUSE frame by a request from a corresponding PAUSE_detection unit by a PAUSE_processing unit included in each of the output_buffers;

22) transmitting the PAUSE frame through an output_buffer by a request from the PAUSE_detection unit by the PAUSE_processing unit;

23) detecting a PAUSE frame of a 10 gigabit Ethernet frame received in a XGMII format by the PAUSE_detection unit;

24) processing the PAUSE frame by a request from the PAUSE_detection unit by the PAUSE_processing unit; and 25) transmitting the PAUSE frame by the PAUSE_processing unit if the number of output_buffers in a PAUSE state at the present time exceeds a set reference value.

33. The Ethernet switching method using frame multiplexing and demultiplexing according to claim 32, wherein the step 20) comprises the steps of:

26) determining whether each received gigabit Ethernet frame is a PAUSE frame immediately after each of the input_buffers completes reception of gigabit Ethernet frames;

27) standing by until each of the input_buffers completes reception of a next frame, if the received gigabit Ethernet frame is not a PAUSE frame; and 28) transmitting the PAUSE frame to a PAUSE_processing unit included in a corresponding output_buffer, if the received gigabit Ethernet frame is the PAUSE frame.

34. The Ethernet switching method using frame multiplexing and demultiplexing according to claim 32, wherein the step 21) comprises the steps of:

29) extracting PAUSE information from the PAUSE frame received from the PAUSE_detection unit, and calculating a PAUSE time;

30) setting a PAUSE timer, which is automatically decreased until a value of the PAUSE timer becomes "0" according to flow of time, to be "0", and decreasing the number of output_buffers in a PAUSE state by "1", if the calculated PAUSE time is "0";

31) increasing the number of output_buffers in a PAUSE state by "1", if the calculated PAUSE time is not "0";

32) replacing the PAUSE timer value with the calculated PAUSE time, and stopping transmission of frames until the PAUSE timer value becomes "0"; and
33) decreasing the number of output_buffers in a PAUSE state by "1", if the PAUSE timer value becomes "0".

35. The Ethernet switching method using frame multiplexing and demultiplexing according to claim 32, wherein the step 22) comprises the steps of:
34) standing by until the output_buffer completes transmission of a gigabit Ethernet frame, which is transmitted at the present time; and
35) outputting the PAUSE frame requested by the PAUSE_detection unit included in the buffer_conversion unit through the output_buffer, immediately after the output_buffer completes the transmission.

36. The Ethernet switching method using frame multiplexing and demultiplexing according to claim 32, wherein the step 23) comprises the steps of:
36) determining whether the received 10 gigabit Ethernet frame is a PAUSE frame immediately after the buffer_conversion unit completes reception of the 10 gigabit Ethernet frame;
37) standing by until the buffer_conversion unit completes reception of a next frame, if the received frame is not a PAUSE frame; and
38) transmitting the PAUSE frame to a PAUSE_processing unit included in the selection_conversion unit, and PAUSE_processing units included in the plural output_buffers, if the received frame is the PAUSE frame.

37. The Ethernet switching method using frame multiplexing and demultiplexing according to claim 32, wherein the step 24) comprises the steps of:
39) extracting PAUSE information from the PAUSE frame received from the PAUSE_detection unit, and calculating a PAUSE time;
40) setting a PAUSE timer, which is automatically decreased until a value of the PAUSE timer becomes "0" according to flow of time, to be "0", and decreasing the number of output_buffers in a PAUSE state by "1", if the calculated PAUSE time is "0";
41) replacing the PAUSE timer value with the calculated PAUSE time, and stopping transmission of frames until the PAUSE timer value becomes "0"; and
42) standing by for reception of a next frame, if the PAUSE timer value becomes "0".

38. The Ethernet switching method using frame multiplexing and demultiplexing according to claim 32, wherein the step 25) comprises the steps of:
43) standing by until the selection_conversion unit completes transmission of a gigabit Ethernet frame, which is transmitted at the present time; and
44) outputting a PAUSE frame containing a preset PAUSE time through the selection_conversion unit immediately after the selection_conversion unit completes the transmission.

* * * * *